(12) United States Patent
Jones et al.

(10) Patent No.: US 10,466,681 B1
(45) Date of Patent: Nov. 5, 2019

(54) SYSTEMS AND METHODS FOR MACHINING KNOWLEDGE REUSE

(71) Applicant: Machine Research Corporation, Wilsonville, OR (US)

(72) Inventors: Richard Thomas Jones, Lake Oswego, OR (US); Brian Dean McCabe, Portland, OR (US); Christopher John Skubic, Portland, OR (US)

(73) Assignee: Machine Research Corporation, Wilsonville, OR (US)

( * ) Notice: Subject to any disclaimer, the term of this patent is extended or adjusted under 35 U.S.C. 154(b) by 616 days.

(21) Appl. No.: 14/842,613

(22) Filed: Sep. 1, 2015

Related U.S. Application Data

(60) Provisional application No. 62/044,739, filed on Sep. 2, 2014.

(51) Int. Cl.
*G05B 19/4093* (2006.01)
(52) U.S. Cl.
CPC .......... *G05B 19/40937* (2013.01); *G05B 2219/35003* (2013.01)
(58) Field of Classification Search
CPC ............................................. G05B 19/40937
See application file for complete search history.

(56) References Cited

U.S. PATENT DOCUMENTS 5,828,575 A  10/1998 Sakai
5,864,482 A * 1/1999 Hazama ............. G05B 19/4097
                                                    700/95
5,886,897 A * 3/1999 Hazama ............. G05B 19/4097
                                                    700/182
5,971,589 A * 10/1999 Hazama ............. G05B 19/4097
                                                    700/145
6,775,647 B1  8/2004 Evans et al.
6,795,749 B2  9/2004 Suh et al.
(Continued)

FOREIGN PATENT DOCUMENTS

CN      103309995       9/2013
EP      0508308 B1      3/1998
(Continued)

OTHER PUBLICATIONS

English-language machine translation of China Patent Publication No. CN 103309995, Sep. 18, 2013.
(Continued)

*Primary Examiner* — Kenneth M Lo
*Assistant Examiner* — Mohammad A Rahman
(74) *Attorney, Agent, or Firm* — Dascenzo Intellectual Property Law, P.C.

(57) ABSTRACT

The present disclosure relates to systems and methods for machining knowledge reuse by determining a machining strategy for a designated part to be formed, based at least in part on machining strategy information used to form one or more similar parts. Methods include receiving an input representation (such as a 3D model) of the designated part, searching a machining knowledge database for one or more similar parts that have a shape similar to the designated part, retrieving machining strategy information that was used to form the similar parts, and deriving a machining strategy for the designated part based at least in part on the machining strategy information used to form the similar parts.

29 Claims, 4 Drawing Sheets

(56) References Cited

U.S. PATENT DOCUMENTS

| | | | |
|---|---|---|---|
| 7,058,472 | B2 | 6/2006 | Mathews et al. |
| 7,155,375 | B1 * | 12/2006 | Rimoldi ............... G06F 17/50 |
| | | | 703/2 |
| 7,168,935 | B1 * | 1/2007 | Taminger ........... B23K 15/0073 |
| | | | 219/121.12 |
| 7,228,196 | B2 | 6/2007 | Dai et al. |
| 7,266,419 | B2 | 9/2007 | Sakai et al. |
| 7,639,868 | B1 | 12/2009 | Regli et al. |
| 8,340,807 | B1 | 12/2012 | Rodrigue et al. |
| 8,429,174 | B2 | 4/2013 | Ramani et al. |
| 8,490,000 | B2 | 7/2013 | Okuwaki et al. |
| 8,606,774 | B1 | 12/2013 | Makadia et al. |
| 8,686,992 | B1 | 4/2014 | Makadia |
| 8,812,272 | B2 | 8/2014 | Martin et al. |
| 9,002,501 | B1 | 4/2015 | Rodrigue et al. |
| 9,101,991 | B1 * | 8/2015 | Tingley, III ............. B23D 5/00 |
| 9,227,323 | B1 * | 1/2016 | Konolige ............... B25J 9/163 |
| 9,405,773 | B2 * | 8/2016 | Chittar ............... G06F 17/3025 |
| 2003/0208293 | A1 | 11/2003 | Mountcastle, III et al. |
| 2003/0210244 | A1 | 11/2003 | Sasago et al. |
| 2004/0249809 | A1 | 12/2004 | Ramani et al. |
| 2005/0113962 | A1 * | 5/2005 | Matthews ........... G05B 19/4097 |
| | | | 700/182 |
| 2006/0062448 | A1 * | 3/2006 | Hirsch ............... A61B 5/0059 |
| | | | 382/154 |
| 2006/0129461 | A1 | 6/2006 | Pankl et al. |
| 2006/0182347 | A1 * | 8/2006 | Kim ..................... G06K 9/4652 |
| | | | 382/190 |
| 2006/0253403 | A1 | 11/2006 | Stacklin et al. |
| 2007/0008312 | A1 * | 1/2007 | Zhou ..................... G06T 7/80 |
| | | | 345/419 |
| 2007/0027845 | A1 | 2/2007 | Dettinger et al. |
| 2008/0056511 | A1 | 3/2008 | Yamaguchi et al. |
| 2008/0201002 | A1 | 8/2008 | Crew et al. |
| 2008/0215427 | A1 * | 9/2008 | Kawada ................. G06Q 30/02 |
| | | | 705/14.51 |
| 2008/0219596 | A1 * | 9/2008 | Shiitani ............. G06F 17/30265 |
| | | | 382/306 |
| 2009/0060393 | A1 | 3/2009 | Satoh |
| 2010/0100457 | A1 * | 4/2010 | Rathod ............. G06F 17/30277 |
| | | | 705/26.1 |
| 2010/0278382 | A1 * | 11/2010 | Chapman ............... G06Q 10/10 |
| | | | 382/100 |
| 2012/0179272 | A1 * | 7/2012 | Dignam ................ A61F 2/5046 |
| | | | 623/33 |
| 2012/0232857 | A1 | 9/2012 | Fisker et al. |
| 2012/0329008 | A1 | 12/2012 | Fishman et al. |
| 2013/0066447 | A1 | 3/2013 | Baierl-Moehler et al. |
| 2013/0116926 | A1 * | 5/2013 | Rodney ................... G01V 1/42 |
| | | | 702/8 |
| 2013/0311450 | A1 | 11/2013 | Ramani et al. |
| 2013/0329243 | A1 | 12/2013 | Pettis et al. |
| 2013/0329257 | A1 | 12/2013 | Pettis et al. |
| 2013/0329258 | A1 | 12/2013 | Pettis et al. |
| 2014/0019299 | A1 | 1/2014 | Stewart |
| 2014/0035182 | A1 | 2/2014 | Boyer et al. |
| 2014/0039659 | A1 | 2/2014 | Boyer et al. |
| 2014/0156053 | A1 | 6/2014 | Madhavi et al. |
| 2015/0186457 | A1 * | 7/2015 | Enomoto .......... G06F 17/30424 |
| | | | 707/769 |
| 2015/0269290 | A1 | 9/2015 | Nelaturi et al. |

FOREIGN PATENT DOCUMENTS

| | | |
|---|---|---|
| JP | 2005-92274 A | 4/2005 |
| KR | 1020140023154 | 2/2014 |
| WO | 2014/091543 A1 | 6/2014 |
| WO | WO 2015/022572 | 2/2015 |

OTHER PUBLICATIONS

English-language machine translation of Korea Patent Publication No. KR 1020140023154, Feb. 26, 2014.

Funkhouser et al., "A Search Engine for 3D Models," *ACM Transactions on Graphics*, 22:1, pp. 83-105, 2003.

Benavente et al., "A Web-Based System for the Design and Manufacture of Feature-Based Prismatic Parts," *19th International Congress of Mechanical Engineering*, Nov. 5-9, 2007.

Allen et al., "AB-CAM: An Agent-Based Methodology for the Manufacture of Step Compliant Feature Based Components," In: *Metal Cutting and High Speed Machining*. Edited by Dudzinski, et al., Kluwer Academic/Plenum, pp. 351-362, 2002. ISBN 0-306-46725-9.

Amaitik, "Development of a Step Feature-Based Intelligent Process Planning System for Prismatic Parts," a thesis submitted to The Graduate School of Natural and Applied Science of Middle East Technical University, Apr. 2005.

Zhang, et al., "Feature Recognition from CNC Part Programs for Milling Operations," *International Journal of Advanced Manufacturing Technology*, No. 70, pp. 397-412, 2014.

Albert, "Getting to Know Knowledge-Based Machining," *Modern Machine Shop*, 75:6, p. 64, Nov. 2002.

Rea, et al., "Commercial and Business Issues in the E-Sourcing and Reuse of Mechanical Components," *International Journal of Advanced Manufacturing Technology*, No. 30, pp. 952-958, 2006.

English-language machine translation of Japan Patent No. 2005-92274A, Apr. 7, 2005.

English-language machine translation of PCT Patent Application Publication No. 2014/091543A1, Jun. 19, 2014.

* cited by examiner

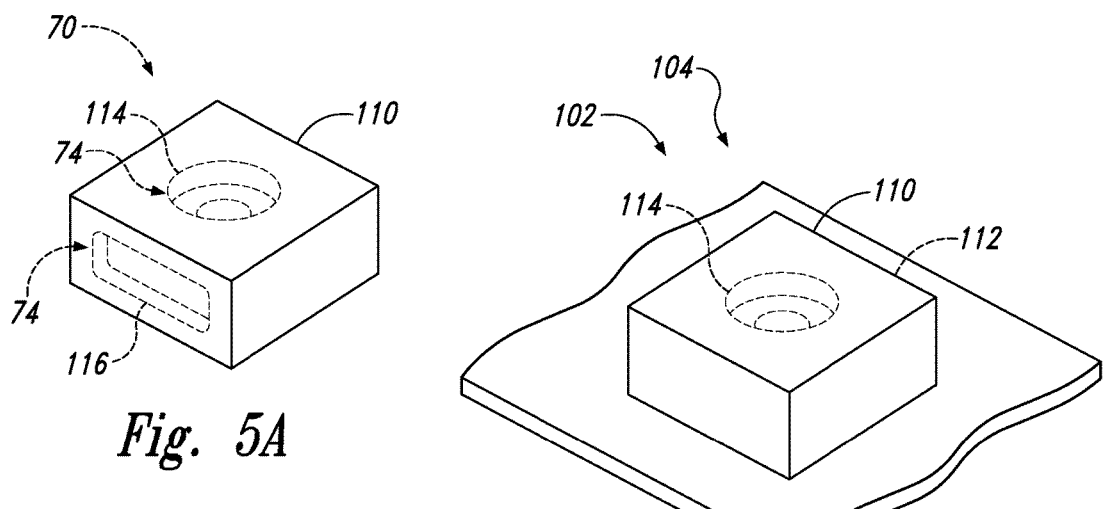
*Fig. 5A*
*Fig. 5B*
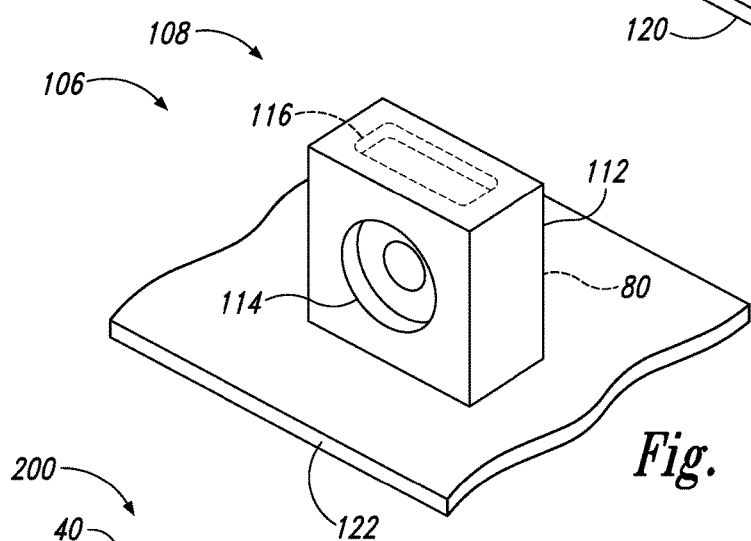
*Fig. 5C*
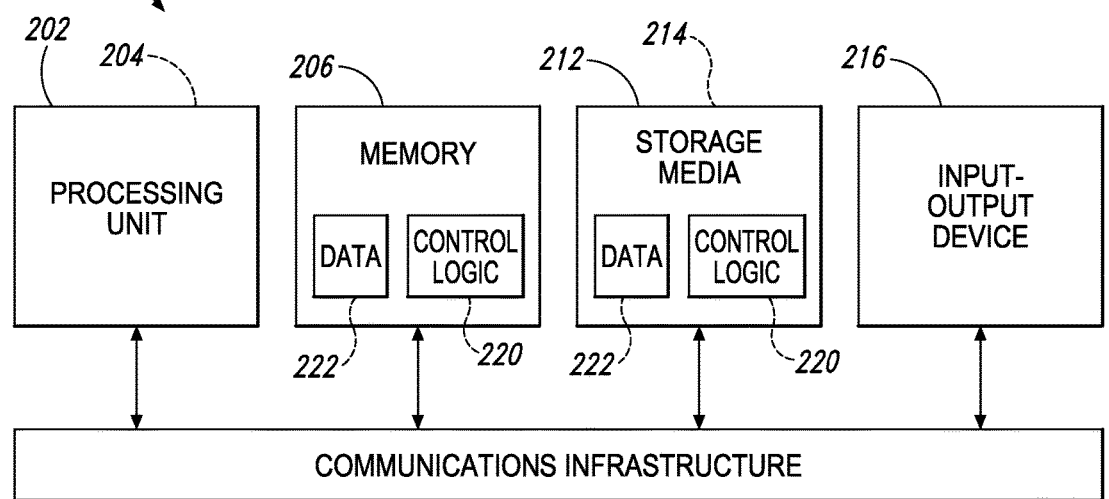
*Fig. 6*

SYSTEMS AND METHODS FOR MACHINING KNOWLEDGE REUSE

RELATED APPLICATION

This application claims priority under 35 U.S.C. § 119(e) to U.S. Provisional Patent Application Ser. No. 62/044,739, entitled "SYSTEMS AND METHODS FOR PART FABRICATION INFORMATION FUSION" and filed on Sep. 2, 2014, the complete disclosure of which is hereby incorporated by reference for all purposes.

FIELD

The present disclosure relates to systems and methods for machining knowledge reuse.

BACKGROUND

Mechanical part design and fabrication often follows a common paradigm. Parts to be fabricated are modeled using tools such as computer-aided design (CAD) systems and/or 3D (three-dimensional) data capture systems (which, e.g., sample surfaces of the physical object). The resulting geometrical model of the part is a 3D model that may be manipulated, analyzed, and/or modified. The geometrical model often is a solid model of the part to be fabricated.

When ready to fabricate the part according to the 3D model, the model and auxiliary data, such as materials, processes, dimensions, and tolerances, are transformed into electronic instructions and human-readable instructions. The electronic instructions control at least one forming machine, and the human-readable instructions describe the workflow and general preparation of the forming machine(s). The transformation process typically is assisted by a computer-aided manufacturing (CAM) system. The resulting electronic instructions ("machining code") typically are in the form of a numerical control (NC) programming language such as the G-codes and M-codes defined by the by ISO 6983/RS274D standards (generally called "G-code"). The resulting human-readable instructions may be in the form of a setup sheet, a control plan, and/or a workflow plan.

The 3D model, work instructions, the machining code, and processing information relating to fabricated parts embody knowledge to recreate the original part and knowledge of how to create similar parts. Preservation, dissemination, and/or use of this knowledge (referred to as machining knowledge) may benefit fabricators and purchasers of fabricated parts by reducing the effort to produce and/or reproduce future parts. For example, recognizing similar parts already fabricated may provide insight into the fabrication of new parts. As another example, reviewing, modifying, and/or re-executing previous machining code may enhance apprentice operators' training and experienced operators' productivity.

NC programming and machining code typically direct the configuration and operation of a forming machine. The overall configuration and operation may be described as a machining strategy. The machining strategy includes a global setup and a sequence of at least one, and typically many, machining operations. Each machining operation includes an operation setup and a sequence of one or more toolpaths that direct the forming machine to deposit, remove, form, and/or shape a workpiece. Despite the use of CAM systems, NC programming remains dependent on an operator/programmer's skill in choosing the forming machine, the forming tools, the order of operations, the tool setup, the workpiece setup, fixturing, and individual toolpaths.

The result of the operator/programmer's choices and expertise is embodied in the machining strategy. However, even where a repository of human-readable instructions and electronic instructions exists, the machining strategy and the association of individual components of the machining strategy are difficult to identify, access, and decipher. Thus, the knowledge of the operator/programmer remains restricted. Fabricators may benefit from enhanced knowledge transfer through better access to the machining strategy of previously formed parts. For example, review of, and/or reuse of, fixturing approaches and/or toolpath patterns of previously formed parts may enhance apprentice operators' training and experienced operators' productivity.

SUMMARY

The present disclosure relates to systems and methods for machining knowledge reuse by determining a machining strategy for a designated part to be formed, based at least in part on machining strategy information previously used to form one or more similar parts. Methods include receiving an input representation (such as a 3D model) of the designated part, searching a machining knowledge database for one or more similar parts and/or part features that are similar to the designated part, retrieving machining strategy information that was used to form the similar parts, and deriving a machining strategy for the designated part based at least in part on the machining strategy information used to form the similar parts.

Methods may include searching the machining knowledge database for two or more similar parts, each similar to the designated part, retrieving machining strategy information (e.g., machining code) used to form each of the similar parts, and deriving the machining strategy for the designated part by assembling and/or merging the machining strategy information for the similar parts. For example, deriving the machining strategy may include assembling a unified machining code block from machining code blocks used to form the similar parts.

BRIEF DESCRIPTION OF THE DRAWINGS

FIGS. 5A-5C schematically represent machining operations on a workpiece.

FIG. 6 is a schematic representation of a computerized system that may be utilized according to the present disclosure.

DESCRIPTION

Figure 1:
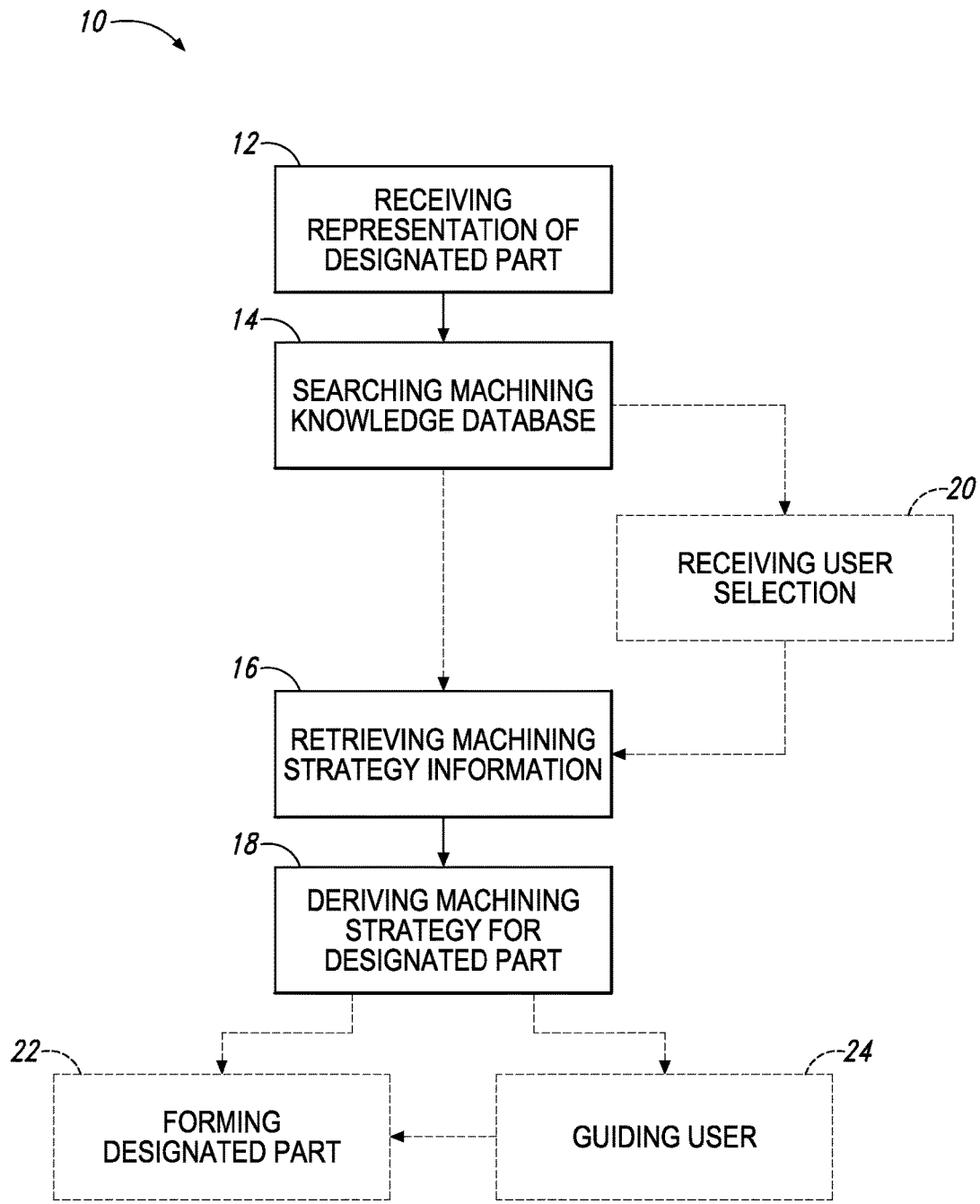
FIG. 1 is a flow chart of methods for determining machining strategy.

FIGS. 1-6 illustrate systems and methods for machining knowledge reuse. Elements that serve a similar, or at least substantially similar, purpose are labelled with numbers consistent among the figures. Like numbers in each of the figures, and the corresponding elements, may not be discussed in detail herein with reference to each of the figures.

Similarly, all elements may not be labelled in each of the figures, but reference numerals associated therewith may be used for consistency. Elements, components, and/or features that are discussed with reference to one or more of the figures may be included in and/or used with any of the figures without departing from the scope of the present disclosure. In the figures, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted without departing from the scope of the present disclosure.

FIG. 1 schematically represents methods 10 of determining machining strategy for a designated part by utilizing machining strategy information of previously fabricated parts. Machining strategy information (also referred to as fabrication information) includes information relating to the fabrication of a part and is retrieved from a machining knowledge database that stores 3D models of previously fabricated parts and associated machining strategy information. Methods 10 include receiving 12 an input representation of a designated part (a part to be formed), searching 14 the machining knowledge database for one or more similar parts that have a shape similar to the designated part, retrieving 16 machining strategy information regarding the similar parts from the machining knowledge database, and deriving 18 a machining strategy for the designated part based at least in part on the retrieved machining strategy information.

As used herein, a user may be a person (e.g., an operator, a programmer, a machinist, etc.), a client device, and/or a client process. The user may utilize the stored information of the machining knowledge database, as described further herein.

The machining knowledge database includes data objects (e.g., the stored 3D models) and associations (relationships) between those objects. The machining knowledge database is a database, typically a relational and/or an object-oriented database. The machining knowledge database includes a file store (a repository of information/data stored in non-transitory storage, i.e., computer-readable media, and typically organized by a file system), an object store (a repository of relationships/associations among the data), and an optional index store (a repository of indices that point to particular relationships and/or data). The indices generally are configured to facilitate the search and identification of data within the machining knowledge database.

A reference to "machining" in this disclosure is also a reference to any and/or all techniques useful to create real, physical parts (referred to as machined parts or as formed parts). Unless the context clearly indicates otherwise, "machining" is used synonymously with "forming" and "fabricating." For example, the CAD/CAM process is effective for fabricating parts using a variety of forming machines and forming processes, e.g., machining, milling, turning, molding, casting, stamping, folding, coating, assembling, and/or additive manufacturing (also referred to as 3D printing). Formed parts may be formed by any combination of fabrication techniques. Forming machines may be configured to perform and/or may perform any combination of fabrication techniques.

The machining knowledge database includes 3D models (i.e., stored 3D models) of parts and machining strategy information that was utilized to form the parts. 3D models are digital descriptions of a part, a formed part, a designed part, a desired part, and/or a hypothetical part. Most, substantially all, or all of the stored 3D models of the machining knowledge database are 3D models of formed parts. 3D models may be in any suitable form or format, with examples including a solid model, a 3D polygonal mesh (e.g., a surface tessellation format and/or a STL file), a 3D wireframe, 3D surface descriptions, a 3D solid, and/or a 3D topology (boundary representation). All or substantially all of the 3D models of the machining knowledge database may be stored in the same form or format. 3D models may be produced by and/or derived from a CAD system (e.g., a CAD model), a CAM system (e.g., a CAM model), a 3D scanner, and/or modeling software. 3D models may describe virtually any type of three-dimensional object, including raw material, a stock piece, a workpiece (before, during, and/or after fabrication), a fixture, a tool, and a forming machine.

A forming machine is a machine that is configured to transform raw material into a formed part. Forming machines are computer-controlled devices that are configured to form a part according to instructions (e.g., machining code) provided by a user. Hence, forming machines may be described as automatic, semi-automatic, robotic, numeric-controlled, computer-controlled, and/or computerized. Examples of forming machines include an NC machine, a machining center, and a 3D printer. Forming machines may be configured with multiple axes of movement (relative translational and/or rotational movement of the tools and workpieces), with more axes of movement (i.e., degrees of freedom) generally corresponding to more versatility to form more complex parts. Forming machines may be 3-axis machines (generally 3 translational axes of movement) or may be multi-axis machines with at least 4, at least 5, or more axes.

A forming machine may transform the raw material by subtractive manufacturing techniques (e.g., machining), additive manufacturing techniques (e.g., 3D printing), molding, casting, folding, stamping, coating, etc. For some techniques, such as molding, casting, stamping, etc., a forming machine also may be employed to form a component (e.g., a mold, a cast, a stamp, a die, etc.) that subsequently is utilized to form other parts. Hence, a forming machine may be used to fabricate a mold, a cast, a die, etc., that subsequently is used in a forming machine to fabricate a finished part. Forming machines are configured to operate one or more tools to form the part. Additionally, forming machines may include one or more other, typically automated, components such as chucks, spindles, stages, indexers, trunnions, carousels, robotic arms, cooling systems, venting systems, and/or waste collection systems. Forming machines may be, and/or may include, assembled machines, such as NC machines and/or 3D printers, and may be an assemblage of one or more such machines and interconnecting components (e.g., materials handling components).

The raw material is the material used by a forming machine to form a formed part. The raw material, which also may be called feedstock, typically is in the form of a stock piece. For example, for machining operations, a stock piece may be plate, block, or bar stock, or it may be a rough-formed part (e.g., a cast part). The stock part typically is composed of a substantially uniform material, such as a metal, metal alloy, or polymer, although this is not required. For additive manufacturing operations, raw material may be bulk liquid polymer (or polymer precursor), catalyst, and/or reactant, and may include, or may be, solids in the form of grains, powder, wires, bulk solids, and/or sheets.

A workpiece is a part as it is being produced, i.e., a partially completed part. Upon beginning the manufacturing process, the raw material (e.g., stock piece) becomes the workpiece. Upon completing the manufacturing process, the workpiece becomes the formed part. The completed workpiece may be a finished, formed part or may be a formed part that is intended for further processing, such as finishing, polishing, heat treating, coating, and/or further forming processes.

Forming machines and/or forming processes may include and/or use a fixture to facilitate the fabrication of a part. A fixture, which also may be referred to as a work-holding fixture, is a component that is used with a workpiece to hold, support, and/or otherwise facilitate the fabrication. A fixture may be a general purpose component or a custom part that is fabricated for the manufacture of a single part or a single type of part. The machining knowledge database may associate the use of a fixture and/or data describing the fixture with a stored 3D model. For example, stored 3D models may be associated with corresponding fixture 3D models, fixture types, fixture part numbers, etc. that describe the respective fixture that was used to fabricate the formed part corresponding to the stored 3D model. Where present, the fixture 3D model may be one of the stored 3D models in the machining knowledge database, i.e., the fixture 3D model may be stored, associated, and/or indexed in the same manner as the other stored 3D models.

Machining code includes a group of computer-readable instructions for a targeted forming machine and may include forming code, code for a forming machine, code for a 3D printer, code for a NC machine, code for a robot, and/or G-code. In fundamental terms, machining code is a description of what to make and how to make it. Machining code generally includes instructions that describe the configuration, operation, and/or processing of the forming machine, what tools to use, the tool setup, and the trajectories of the tools (toolpaths). Machining code may include all or a portion of the instructions to make a part. For example, different blocks of machining code may direct the fabrication of different features of a part. Machining code may be directed to a forming machine generally, may be directed to components of a forming machine, and/or may be directed to different forming machines. For example, one type of machining code may control an NC machine while another type of machining code may control a materials-handling robot.

Parts are formed following a machining strategy (which also may be called a machining plan, a forming strategy, and/or a forming plan). The machining strategy is the specific configuration and operation of the forming machine, or forming machines, to create the formed part. The machining strategy includes a sequence of one or more machining operations that, when performed in order, on the targeted forming machine, with the specified tools, raw materials, workpiece, and/or fixtures, create the formed part. Machining code that expresses, describes, and/or instructs a machining strategy is referred to as machining strategy code.

Machining operations (which also may be called machining stages, forming machine operations, and/or forming machine stages) are units of processing of the part (i.e., workpiece) as it is being formed. Each machining operation may correspond to use of a particular fixture, holding the workpiece in a particular orientation, and/or fabrication of the workpiece from/at a particular workpiece face. Each machining operation includes a sequence of one or more toolpaths that direct the forming machine to deposit, remove, form, and/or shape a workpiece. A machining operation may include associated forming machine and/or tool configurations, operations, and/or processes (collectively referred to as operation setup). Examples of operation setup include a forming machine identification, a forming machine operation parameter, a forming machine temperature control state, a cooling configuration, a forming machine lubrication control state, a waste management configuration (e.g., ventilation, waste containment), a workpiece setup (e.g., description, 3D model, transport/location, orientation, fixturing), a tool type, a tool identification, a tool choice (e.g., tool exchange), a tool operation parameter, and/or a tool setup (e.g., orientation, spindle speed, temperature, dispense rate). Machining code that expresses, describes, and/or instructs a machining operation is referred to as machining operation code.

Toolpaths, also called trajectories, are units of tool movement. A toolpath may include positioning portions and/or active portions. As used herein, a positioning portion of a toolpath refers to a portion of the toolpath in which material is not added to or removed from the corresponding workpiece, and an active portion of a toolpath refers to a portion of the toolpath in which material is added to or removed from the workpiece. A toolpath may include instructions for positioning (including moving, orienting, and/or locating) a tool relative to the workpiece and/or instructions for affecting the shape of the workpiece (e.g., by cutting, polishing, dispensing, and/or polymerizing). Each toolpath includes a sequence of steps that configures and/or moves a tool relative to the workpiece and/or components of a forming machine. The toolpath may include the specific speed and displacements to achieve a specific motion. Generally, execution of a toolpath results in modification of the workpiece (i.e., each toolpath generally includes an active portion). Toolpaths may correspond to one or more machining features as described further herein. Machining code that expresses, describes, and/or instructs a toolpath may be referred to as toolpath code.

Toolpaths include a series of command positions that command the forming machine to move the tool to a location (specifying position and/or orientation). Toolpaths also include operational parameters of the tool and/or forming machine that specify how the tool is operating relative to the workpiece. For example, toolpaths may specify spindle speed, feed speed, tool displacement speed, dispense speed, operational pressure, operation temperature, etc.

A tool, which also may be called a forming tool, a machining tool, a cutter, and/or a print head, is a potentially interchangeable component of a forming machine configured to impart (by adding material, removing material, and/or shaping material) new form to the workpiece. Examples of tools include a milling cutter, a drill bit, a cutting tool, a tool bit, a rotary file, a laser source, an electron beam source, an extruder head, and a nozzle.

Formed parts (completed workpieces) and 3D models may be logically and/or structurally composed (though not necessarily exclusively composed) of one or more machining features. A machining feature is a surface or a group of surfaces formed by a tool. Hence, though a machining feature may have functional value, a machining feature is a structure and/or a structural characteristic rather than a functional characteristic. Examples of machining features include a hole, a pocket, a plane, a contour, and a protrusion. A machining feature is typically the result of one or more toolpaths, and/or the result of a machining operation. Machining code that expresses, describes, and/or instructs sufficient operations to form a machining feature may be referred to as machining feature code and/or feature code.

Machining features may be described by the surfaces of the formed part and/or may be described by a 3D model (e.g., a solid model) that includes surfaces corresponding to the formed part. 3D models of machining features may be referred to as machining feature models. Particularly for machining features formed by subtractive manufacturing methods, machining features may be described by negative geometry and/or a negative geometry model (a 3D model). The negative geometry and the negative geometry model describe the volume of material removed from an actual or hypothetical stock piece to form the surfaces of the machining feature. Where a hypothetical stock piece is used as a reference, the stock piece may be modeled as a bounding box around the formed part. Particularly for machining features formed by additive manufacturing methods, machining features may be described by positive geometry and/or a positive geometry model (a 3D model). The positive geometry and the positive geometry model describe the volume of material added to a workpiece, an actual stock piece, or a hypothetical stock piece. Each machining feature generally is the result of one or more toolpaths that affect the shape of the workpiece and thus form the machining feature.

Machining features may include, and/or may be described as, one or more sub-features. For example, machining features may be logically decomposed into a set of primitive shapes, such as a geon (a simple 2D or 3D form, such as a cylinder, brick, wedge, cone, circle, sphere, rectangle, etc.), a plane, a pocket, a hole, and/or a contour. Each of the primitive shapes may be a machining feature and may have identifiable machining code associated with the creation of the primitive shape.

The machining knowledge database may include one or more machining features for at least one, optionally each, stored 3D model; and the machining knowledge database may associate at least one, optionally each, stored 3D model with one or more machining features of the stored 3D model. The machining feature models may be stored in the machining knowledge database as independent 3D models (i.e., stored 3D models of the machining knowledge database) and/or linked to the stored 3D model of the formed part (i.e., as a subset and/or a reference to a portion of the stored 3D model). The 3D model of a machining feature may be a negative geometry model, a positive geometry model, and/or a 3D model that includes surfaces corresponding to the formed part. The stored 3D model of the formed part may be stored, at least in part, in the machining knowledge database as a group of machining feature models, with each of the machining feature models corresponding to one or more machining features of the formed part.

The machining knowledge database may be configured for searching for stored 3D models based at least in part on the shape and/or other geometric attributes of the 3D models. In one such embodiment, the machining knowledge database includes stored part signatures relating to the shapes and/or other geometric attributes of the corresponding 3D models. The stored part signatures may be an index and/or may be indexed for quick search and/or retrieval of stored 3D models within the machining knowledge database. Part signatures, which also may be referred to as digital signatures and digital fingerprints, include a shape metric corresponding to geometric attributes (e.g., the shape) of the corresponding part and may include a physical metric corresponding to physical properties of the corresponding part. Part signatures may include one or more feature signatures that each describe geometric attributes (e.g., with a feature shape metric) and/or physical properties (e.g., with a feature physical metric) of a respective machining feature of the corresponding part.

The machining knowledge database may group, associate, and/or relate stored 3D models with similar part signatures and/or similar feature signatures. For example, the shape metric and/or the feature shape metric may include hierarchical components corresponding to geometric attributes of higher resolution in each level of the hierarchy. As an example, the shape metric and/or the feature shape metric may encode the volume and surface area as top level geometric attributes, and the number of vertices and edges as second level geometric attributes. Part signatures may be compared for similarity and/or grouped according to a similarity score. Such a similarity score may include, for example, a Euclidean distance between the compared part signatures and/or a correlation between the compared part signatures.

Shape metrics and feature shape metrics typically describe and/or are related to local and global geometric attributes, thus describing high resolution and low resolution details of respective 3D models (of parts and/or machining features). For example, shape metrics and/or feature shape metrics may be in the form of attribute vectors that encode different geometric attributes (e.g., volume, surface area, number of edges, edge connectivity) along different dimensions of the attribute vector. As another example, shape metrics and/or feature shape metrics may encode a respective series of wavelets and/or Fourier coefficients (e.g., the result of a discrete wavelet and/or Fourier transformation) that describe the corresponding part and/or machining feature. Further, shape metrics and/or feature shape metrics may be invariant under scaling, rotation, and/or translation transformations of the corresponding 3D model. Shape metrics may correspond to and/or encode one or more machining features of the respective part. Shape metrics and/or feature shape metrics may be a collection of the feature shape metrics that describe the constituent machining features of the respective part and/or machining feature.

Part signatures and/or feature signatures may include and/or may relate to physical properties relating to the respective part and/or machining feature. For example, the part signature may include a physical metric that corresponds to one or more physical properties of the respective part. Physical properties may include the material type, a bounding box of the corresponding part and/or machining feature, the volume of the corresponding part and/or machining feature, a volume removed from a (real or hypothetical) stock piece, a volume added to a (real or hypothetical) stock piece, a mass of the part, a density of the part, a surface area of the part, a surface finish, a surface treatment, and/or a surface coating.

The machining knowledge database may include, for one or more, and optionally each, formed part described by a stored 3D model, machining code that was used to form at least a portion of, and often substantially all or all of, the formed part described by the respective stored 3D model. The machining knowledge database also may associate stored 3D models and the corresponding machining code (if any). Further, at least one, optionally each, of the machining features in the machining knowledge database may be associated with machining feature code. The machining feature code associated with the corresponding machining feature may be stored in the machining knowledge database as independent machining code blocks and/or linked to the machining code associated with the stored 3D model of the formed part (i.e., as a subset and/or a reference to a portion of the machining code associated with the 3D model of the formed part). The machining code associated with a stored 3D model may be stored, at least in part, in the machining knowledge database as a group of machining feature code blocks, with each of the machining feature code blocks including machining code that was used to form the corresponding machining feature of the formed part.

The machining knowledge database, the stored part signature, and/or the stored feature signature may include auxiliary machining information associated with the stored 3D models and/or the corresponding parts and/or machining features. Auxiliary machining information may include and/or may be related to product and manufacturing information (PMI; e.g., dimensions, tolerance, surface finish, materials, etc.), forming type (type of forming process, e.g., subtractive manufacturing, milling, drilling, turning, additive manufacturing, molding, casting, stamping, folding, coating, and assembling), forming machine type (type, model, location, etc. of the targeted forming machine), material type (identity, quantity, quality, stock piece size, stock piece shape, stock piece model, etc.), part name, textual description of the formed part (e.g., shape and/or physical description, part name, part function, etc.), customer name, date of manufacture, actual production cost, and/or actual production time. Auxiliary machining information may include a production summary and/or a parameter related to production, for example, production cost, NRE (non-recurring engineering) cost, fabrication cost, production time, NRE time, fabrication time, and/or delivery time.

Further, at least one, and optionally each, of the machining features in the machining knowledge database may be associated with at least one of a production cost, a relative production cost, a production time, and a relative production time of the machining feature. The relative production cost and the relative production time are the fractional production cost and time, respectively, of the machining feature relative to the production cost and time, respectively, of the entire formed part. The production time of each machining feature may be determined by calculating the total time to execute the machining code corresponding to the machining feature. The time to execute the code may be based at least in part upon the tool trajectories (e.g., feeds and speeds of the forming machine). The production cost of each machining feature may be determined by multiplying the actual cost of forming the formed part by the relative production time of the machining feature (i.e., the production time of the machining feature divided by the production time of the entire formed part).

The machining knowledge database may be produced (e.g., created, constructed, and/or augmented) by receiving and/or extracting part data. Part data may be sourced from the user and/or from a file system and/or a file repository (such as an intranet, a network, and/or the internet). Methods of producing the machining knowledge database may include identifying a 3D model corresponding to a part and/or machining feature, determining and/or receiving a part signature and/or a feature signature for the 3D model and corresponding part and/or machining feature, and associating the 3D model and the part signature (and/or the feature signature) together in the machining knowledge database. Methods of producing the machining knowledge database may include identifying machining code for the formed part corresponding to the 3D model (i.e., machining code that was used to form at least a portion of the formed part) and associating the machining code with the corresponding 3D model in the machining knowledge database. The machining code in the machining knowledge database may be any type of machining code described herein, e.g., machining strategy code, machining operation code, toolpath code, machining feature code, and/or portions thereof.

Producing the machining knowledge database may include associating at least one of the 3D models with one or more machining features of the corresponding formed part. Machining features may be stored and/or associated as machining feature models, each typically a 3D model of the machining feature. The machining features may be associated with machining code (i.e., machining feature code) that was used to form the corresponding machining feature of the formed part.

Machining strategy information describes the machining strategy and generally includes information sufficient to identify and/or to create (and/or to recreate) a corresponding part (e.g., a part whose 3D model and machining strategy information are stored in the machining knowledge database). For example, the machining strategy information may include machining code, machining strategy code, machining operation code, machining features, machining feature descriptions, machining feature models, a forming type of the part (type of forming process), a material type of the part (identity, quantity, quality, size, shape, etc.), a stock piece size, a stock piece model, a textual descriptor of the part, fixturing (e.g., identification of fixtures and/or hold positions/orientations used to fabricate the part), tool selection, and/or tool operation (spindle speed, temperature, dispense rate, etc.). Further, the machining strategy information may include auxiliary machining information (e.g., metadata) associated with the part, the 3D part model, and/or the machining strategy. Examples of this additional information include product manufacturing information (PMI), part name, customer, date of machining code generation, date of manufacture, actual production costs, actual production time, feature production cost, and/or feature production time.

Figure 3:
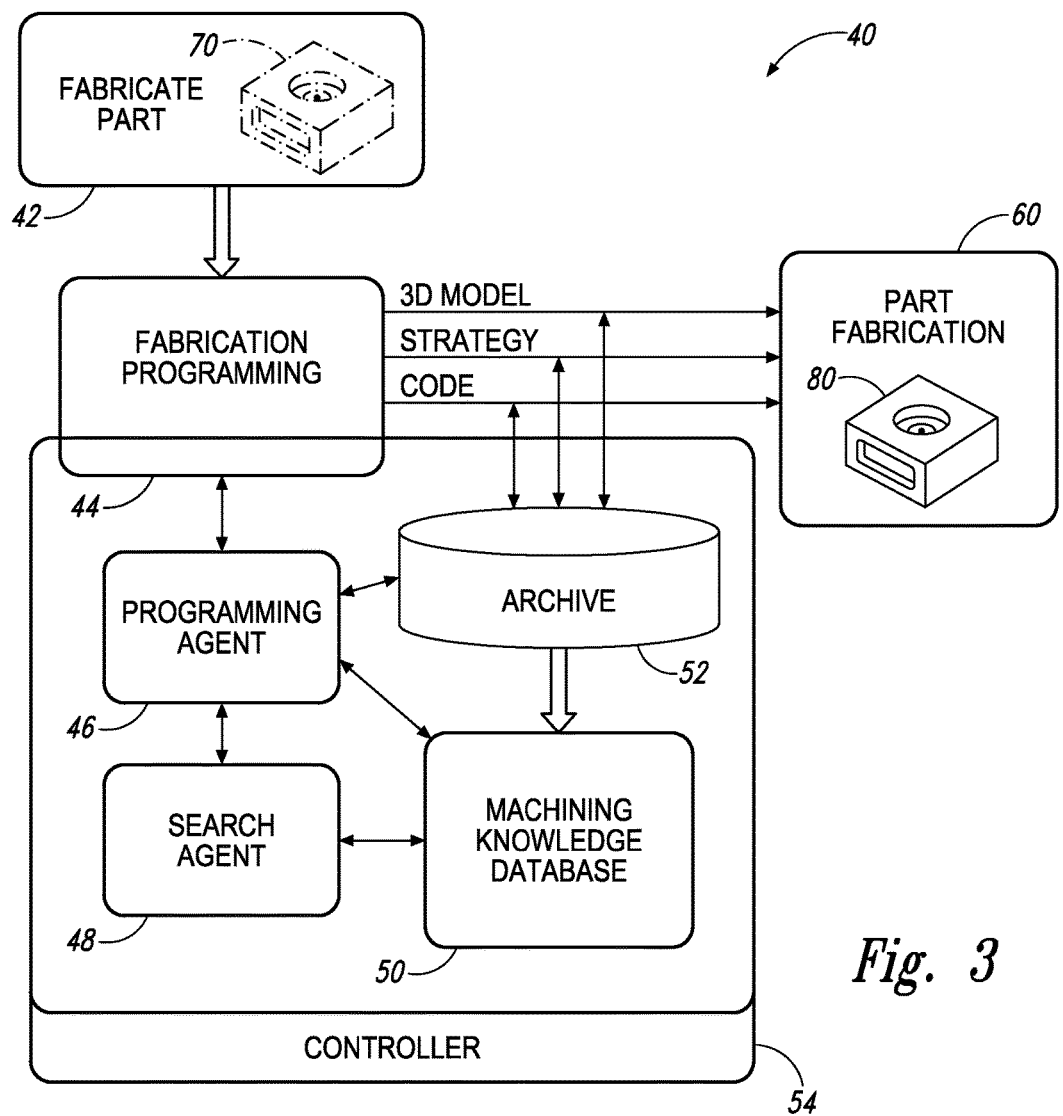
FIG. 3 is a schematic representation of a programming system according to the present disclosure.

As shown in FIG. 1, methods 10 include receiving 12 the input representation of the designated part. Receiving 12 may include receiving the input representation directly or indirectly from the user. Receiving 12 may include accessing, identifying, and/or creating the input representation. For example, the user may select an input representation from a range of choices, and a computerized system (e.g., programming system 40 as shown in FIG. 3 and described further herein) may receive the result of the selection. As another example, the computerized system may monitor user actions and/or a file system that receives input representations of parts to be fabricated. When the computerized system determines the user has created and/or stored a sufficient input representation, the computerized system may receive the input representation (e.g., by accessing and/or identifying).

The input representation may be a 3D model of the designated part. Additionally or alternatively, the input representation may be a 3D sketch, a 2D model, a 2D sketch, and a 2D image of the designated part. Where the input representation is not a 3D model, receiving 12 may include converting the input representation into a 3D model.

The input representation may include machining features of the designated part. Additionally or alternatively, receiving 12 may include determining, selecting, and/or identifying one or more machining features of the designated part.

Generally, where the systems and/or methods disclosed herein determine, identify, and/or select a machining feature of a description of a part (e.g., a 3D model of the part, a textual description of the part, a keyword description of the part, a 2D image of the part, a 2D sketch or other rendering of the part, and/or a 3D sketch or other rendering of the part), the determination, identification, and/or selection may include analysis of the description for machining features and/or analysis of machining code that was utilized to form the part (if available). Analysis of the description generally involves a search for specific machining feature shapes and/or a decomposition of the model, image, and/or sketch into components.

The machining features may be identified by analyzing the 3D model of the part and/or by analyzing the machining code corresponding to the part. Analyzing may include decomposing the 3D model into machining features based upon surfaces, surface arrangements, primitive shapes, negative geometries, and/or positive geometries, as described herein with respect to determining, identifying, and/or selecting machining features of the input representation.

Analyzing the 3D model may include decomposing, and/or parsing, the geometry of the 3D model into basic shapes, such as common machining features (e.g., a plane, a pocket, a hole, and/or a contour) and/or geometric volumes (e.g., a generalized conic, a basis shape, and/or a geon). Generally, machining features may be identified from the 3D model by analyzing deviations from a stock piece 3D model (actual or estimated), a bounding box around the 3D model, and/or an included box wholly within the 3D model. For example, the largest-scale machining features may be discontinuous volumes that result from the volumetric difference between the stock piece 3D model (or a hypothetical stock piece such as a bounding box or an included box) and the 3D model. Each discontinuous volume may be identified as a separate machining feature and/or may be further decomposed into smaller and/or more primitive shapes, e.g., sub-features and/or shape primitives such as geons, planes, pockets, holes, and/or contours. Additionally or alternatively, the negative geometry and/or positive geometry of the 3D model may be separated into discontinuous volumes, where each discontinuous volume optionally is identified as a machining feature and/or further decomposed into machining features and/or primitive shapes.

Analyzing the machining code may include determining the 3D model of material added to and/or removed from the part (e.g., the workpiece and/or the stock piece) by one or more toolpaths (traversed by identified tools) described by the machining code corresponding to the formed part. For example, the 3D model of material added or removed may be determined by reverse simulating the machining code, or at least a subset of the machining code corresponding to a toolpath and/or a machining operation. Simulating machining code typically includes simulating the effects of the toolpaths and other operations of the machining code to transform a stock piece into the formed part. Reverse simulating machining code typically includes running the machining code in reverse and operating the toolpaths in reverse (including adding material for subtractive operations and subtracting material for additive operations) to transform the formed part into the stock piece. The 3D model of material added to or removed from the part may be separated into discontinuous volumes, where each discontinuous volume optionally is identified as a machining feature and/or further decomposed and/or parsed into machining features and/or primitive shapes (i.e., analyzed essentially in the same manner as analyzing the 3D model geometry). Additionally or alternatively, machining features may be identified with specific sections of machining code by parsing the machining code. Parsing the machining code may result in the identification of machining code sections that may be subject to reverse simulation and/or other processes. Machining code may be parsed and/or sectioned according to specific commands within the machining code, for example, tool selection commands, toolpaths, and/or machining operations.

Receiving 12 may include receiving information about the designated part in addition to the input representation. For example, receiving 12 may include receiving an indication of one or more machining features of the designated part, physical properties of the designated part, and/or a targeted forming machine type. Additionally or alternatively, the input representation may include an indication of one or more machining features of the designated part, physical properties of the designated part, and/or a targeted forming machine type. The indication of, e.g., the machining features, the physical properties, and/or the forming machine type, may be a selection from a range of options and/or may be a textual description. In particular, an indication of a machining feature may include a 3D model of the machining feature, a negative geometry model of the machining feature, a surface of the machining feature (a surface of the designated part), a region including at least a portion of the machining feature, a volume including at least a portion of the machining feature, a textual description of the machining feature, a keyword description of the machining feature, a 2D image of the machining feature, a 2D sketch of the machining feature, and/or a 3D sketch of the machining feature.

Methods 10 include searching 14 the machining knowledge database for one or more similar parts that have a shape similar to the designated part. Searching 14 may include generating search results that include the one or more similar parts and/or presenting the search results to the user. The number of similar parts found, and/or in the search results, may be at least one, at least two, or more similar parts. The search results may include representations (e.g., 3D models, 2D drawings, descriptions, etc.) of the one or more similar parts. Search results may be filtered and/or ranked. For example, only search results which meet a minimum similarity score may be included, only search results with particular geometric and/or physical attributes may be included, and/or search results may be ranked with a relevancy score based at least in part on shape similarity.

Searching 14 may include searching the machining knowledge database for one or more similar parts that have one or more machining features similar to at least one of the machining features of the designated part (and/or similar to at least one of the machining features associated with the input representation). Searching 14 may include determining, selecting, and/or identifying machining features of the similar parts, as described further herein. The search results may include machining features of the similar parts. The machining features of the similar part(s) that are similar to machining features of the designated part may be related by scaling, translation, rotation, and/or shape similarity.

Searching 14 may be based at least in part on physical properties and/or auxiliary machining information, e.g., a material type of the designated part, a size of the designated part, a stock piece to be utilized to form the designated part, a feedstock to be utilized to form the designated part, a forming machine type to be utilized to form the designated part (e.g., an NC machine, a machining center, a 3D printer, a 3-axis machine, and/or a multi-axis machine with at least 4 axes and/or with at least 5 axes), and/or a tool type to be utilized to form the designated part. Additionally or alternatively, search results may be filtered, ranked, and/or refined by user-supplied search criteria, such as material type, size, stock piece, feedstock, forming machine type, and/or tool type. Searching 14 may include returning search results with similar parts that meet the search criteria (e.g., all of the similar parts were formed with the same type of forming machine). Searching 14 may be performed before and/or after receiving search criteria from the user. For example, methods 10 may include searching 14, presenting the user search results, receiving a selection of the search results and/or search criteria from the user, and repeating the searching 14 based at least in part on the selection and/or search criteria.

Similar parts and similar machining features are similar with respect to at least the shape of one or more subregions (e.g., machining features and/or surfaces) of the respective part and machining feature. Shape similarity thus may refer to similar geometry. For example, at least a subset of the surfaces of similar parts and/or similar features may be described by the same dimension(s), the same geometrical model, and/or by geometrical models related by a geometrical transformation (e.g., translation, rotation, and/or scaling). As a further example, two holes may be found to be similar if the two holes have the same diameter, depth, diameter and depth, and/or diameter to depth ratio.

Shape similarity and sameness may take into account part tolerances (e.g., design and/or manufacturing tolerances), forming machine tolerances, and/or typical, practical, and/or achievable tolerances. For example, two dimensions may be found the same if the tolerance ranges overlap.

For physical properties and other non-geometric attributes, similarity may be established by comparing characteristic metrics of the attributes. Numeric values may be found similar if identical, within a predetermined relative difference, and/or within a predetermined absolute difference. For example, weights and/or surface areas may be found similar if the absolute difference is less than 50%, less than 20%, less than 10%, less than 5%, less than 2%, and/or or less than 1%. Non-numeric attributes may be found similar if two are identical, share the same classification, and/or share a sufficient number of related attributes. For example, material types may be found similar if they describe the same metal, alloys of the same metal, and/or materials composed of substantially the same constituents. As another example, surface finishes may be similar if they are identical and/or describe surfaces with similar roughness.

Methods 10 may include receiving 20 a user selection of one, two, or more of the similar parts. For example, receiving 20 may include receiving a selection of the one, two, or more of the search results (similar parts and/or similar machining features).

Methods 10 include retrieving 16 machining strategy information from the machining knowledge database regarding the one, two, or more similar parts (and/or similar machining features) obtained by the searching 14 and/or the receiving 20 the user selection. The similar parts may be at least a portion of the search results and/or the user selection of the search results. The similar parts may include similar parts of the user selection and similar parts not selected by the user.

The machining strategy information retrieved, and optionally retrieved for each of the similar parts, may include machining strategy, machining operations, machining feature descriptors, machining code, machining operation code, machining strategy code, and/or machining feature code. At least one (optionally each) of the machining strategies of the machining strategy information may include machining strategy code, machining operation code, and/or machining feature code that was utilized to form at least a portion of the respective similar part. At least one (optionally each) of the machining operations of the machining strategy information may include machining operation code and/or machining feature code that was utilized to form at least a portion of the respective similar part. At least one (optionally each) of the machining feature descriptors of the machining strategy information may include machining feature code that was utilized to form the respective machining feature in the respective similar part.

Where retrieving 16 includes retrieving machining code that includes instructions to form more than the similar machining feature, retrieving 16 may include parsing the retrieved machining code to identify and/or extract the machining code that was used to form the similar machining feature, as discussed further herein. Parsing may include separating the machining code according to machining operations, toolpaths, and/or tool selection commands. Parsing may include identifying a toolpath with a surface of the similar machining feature, in which case the machining feature code may include instructions to form the surface and/or to execute the toolpath.

Retrieving 16 may include retrieving fixturing information regarding the similar parts. Additionally or alternatively, the machining strategy information may include fixturing information regarding the similar parts. The fixturing information may include a 3D model of a fixture utilized to form the respective similar part, a rendering and/or an image of a fixture holding the respective similar part during a processing step utilized to form the respective similar part (e.g., during a machining operation), and/or a hold position (e.g., orientation of the workpiece) utilized to form the respective similar part.

Methods 10 include deriving 18 the machining strategy for the designated part based at least in part on the retrieved machining strategy information. Deriving 18 includes deriving the machining strategy based on at least the machining strategy information retrieved for at least one of the similar parts. Deriving 18 may include utilizing machining strategy information from two or more sources, such as two or more of the similar parts and/or one of the similar parts and existing strategy. Existing strategy may be tentative, suggested, and/or partial machining strategy for the designated part, and may be created, for example, by the methods 10 previously performed, traditional CAM programming, and/or other methods of producing machining strategy for a part to be fabricated. Deriving 18 may include deriving a complete machining strategy (e.g., when followed, results in the designated part) and/or a tentative, suggested, and/or partial machining strategy for the designated part (e.g., requires further information and/or processing to produce the designated part).

Deriving 18 may include adjusting, merging, and/or replacing at least a portion of the machining strategy information from each of the information sources (e.g., similar parts and/or existing strategy). For example, where retrieving 16 includes retrieving a first machining code block utilized to form at least a portion of a first similar part and a second machining code block utilized to form at least a portion of a second similar part, deriving 18 may include assembling a unified machining code block from the first machining code block and the second machining code block, as described further herein with respect to the example of FIG. 2. As another example, where the machining strategy information includes machining code utilized to form at least a portion of one of the similar parts, deriving 18 may include merging the machining code of the machining strategy information with machining code configured to form at least a portion of the designated part.

Deriving 18 may include deriving machining code to form at least a portion of the designated part from machining code of the retrieved machining strategy information. Deriving 18 may include deriving a machining operation to form at least a portion of the designated part from at least one machining operation of the machining strategy. Deriving 18 may include deriving the machining strategy targeted to a type of forming machine utilized to form at least one of the similar parts uncovered in the searching 14.

Methods 10 may include forming 22 the designated part based at least in part on the derived machining strategy. Thus, methods 10 may include methods of forming a designated part. Where the derived machining strategy includes machining code, methods 10 may include forming 22 the designated part based at least in part on the machining code, simulating the machining code, reviewing the machining code, and/or editing the machining code.

Methods 10 may include guiding 24 the user to form at least a partial machining strategy for the designated part. Guiding 24 may include presenting the user with the derived machining strategy so that the user may review the derived machining strategy, may utilize at least a portion of the derived machining strategy to form the designated part, and/or may compare the derived machining strategy to other machining strategy for the designated part (created otherwise). Guiding 24 may include providing the user with a suggestion for machining strategy and/or machining operations based upon the machining strategy for the designated part. For example, guiding 24 may include providing at least one of a stock piece description, a fixture, a hold position, and/or an operation order. Guiding 24 may include providing the user with a suggestion for machining strategy and/or machining operations based upon the retrieved machining strategy information. For example, guiding 24 may include providing at least one of a stock piece description, a fixture, a hold position, and/or an operation order that was utilized to form at least one of the similar parts. As another example, guiding 24 may include notifying the user of missing machining information and/or machining information not yet received (e.g., machining information utilized to form at least one of the similar parts but not in the user's machining strategy as developed). As yet another example, guiding 24 may include presenting a common machining strategy step and/or machining operation recognized within the retrieved machining strategy information (e.g., common to at least two of the similar parts).

Figure 2:
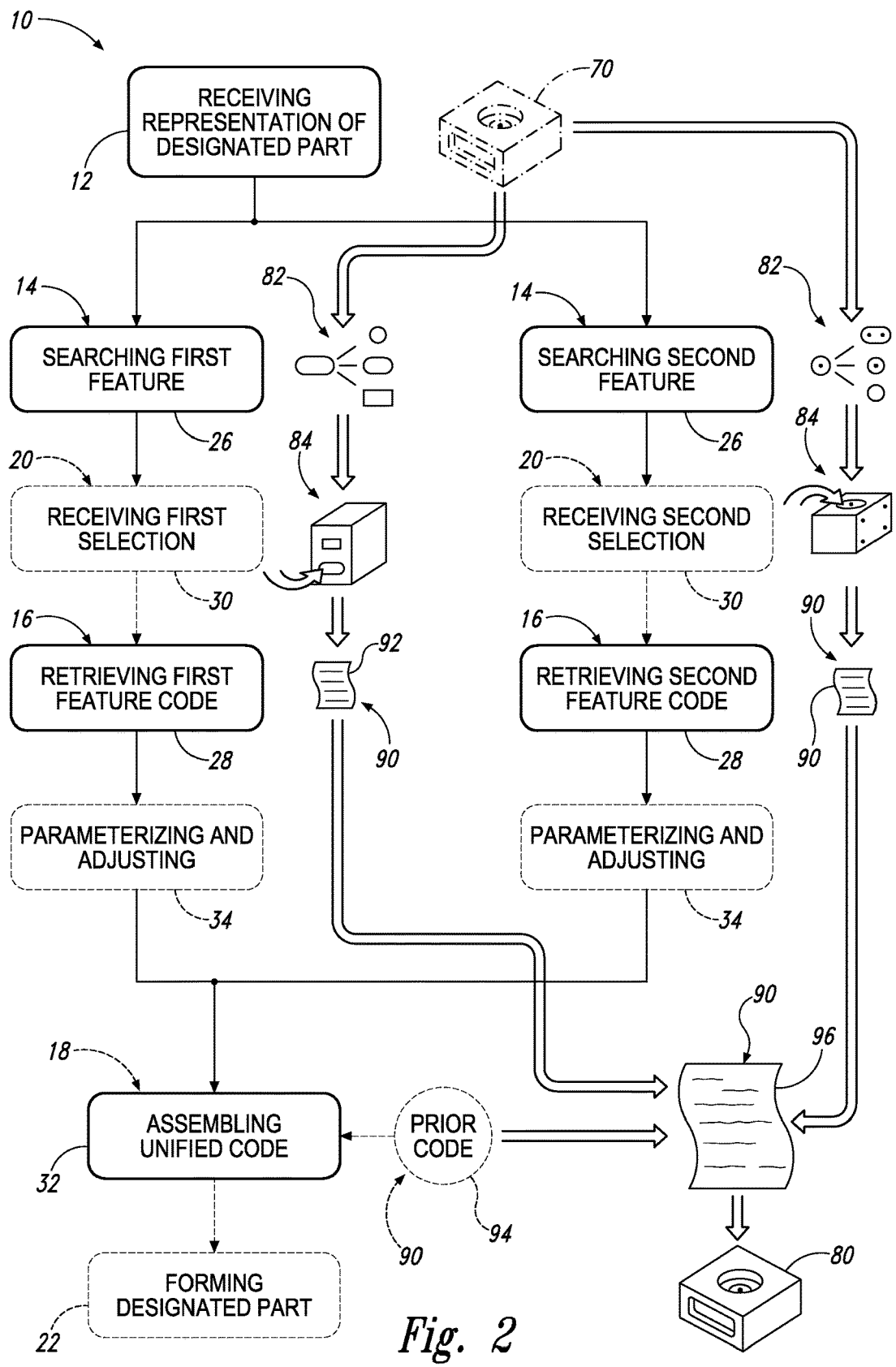
FIG. 2 is a schematic representation of methods of merging two or more machining code sources.

FIG. 2 schematically represents an example of methods 10 in which machining code 90 from two or more sources may be merged to create a unified machining code 96 for fabricating the designated part. In the example of FIG. 2, methods 10 include receiving 12 an input representation of a designated part 70, searching 14 the machining knowledge database for at least one machining feature similar to a machining feature of the designated part, retrieving 16 machining strategy information that includes at least machining feature code 92 for the similar machining feature, and deriving 18 a machining strategy for the designated part by at least assembling 32 unified machining code 96 based at least in part on the retrieved machining feature code 92.

As indicated in FIG. 2, the two or more sources of machining code 90 may include retrieved machining feature code 90 relating to one or more machining features, and may include prior machining code 94 relating to the designated part. Additionally or alternatively, the sources of machining code 90 may include machining code that was utilized to form at least a portion of a similar part of the machining knowledge database (e.g., machining strategy code, machining operation code, machining code, and/or toolpath code). Though the method of the example of FIG. 2, includes two processing paths for two different machining features and corresponding machining feature code 92, methods 10 may include one or more processing paths corresponding to one or more machining features (e.g., one, two, three, or more machining features). Additionally or alternatively, methods 10 may include repeating the receiving 12, searching 14, retrieving 16, and the assembling 18, with the unified machining code 96 of one iteration becoming the prior machining code 94 for the next iteration.

Receiving 12 may include receiving (from the user) a selection of an input machining feature of the designated part and/or may include accessing, identifying, and/or creating a representation of an input machining feature of the designated part. Receiving 12 may include receiving at least two inputs (e.g., selections) that indicate input machining features. At least one of the input machining features may be a machining feature of a formed part (or a part other than the designated part). Each input machining feature may be represented by a 3D model (or other input representation as discussed herein) of the designated part, the formed part, and/or the subject machining feature.

For at least one, optionally each, input machining feature, the method of the example of FIG. 2 includes searching 26 the machining knowledge database for parts with similar machining features (i.e., machining features with a shape similar to the input machining features). Searching 26 may produce a search result 82, for each search, that includes one or more similar machining features and/or one or more parts with similar machining features. Additionally or alternatively, searching 26 may produce a search result 82 with one similar machining feature and/or a ranked search result with a single most similar/relevant machining feature.

The method of the example of FIG. 2 may include receiving 20 from the user a selection of the similar machining features of at least one, optionally each, of the search results 82. Each of the selections chosen from the search results 82 indicates one of the similar machining features of the search results. In FIG. 2, the user selection is schematically illustrated by 84 indicating the selection of a particular feature on a particular fabricated part.

After searching 26 and optionally receiving 20 the user selection(s), the method of the example of FIG. 2 includes retrieving 28, from the machining knowledge database, machining code, generally machining feature code 92 in the form of a feature code block, that includes machining code that was utilized to form each of the machining features indicated by the selections and/or the search results. For example, methods 10 may include retrieving 28 a first feature code block and retrieving 28 a second feature code block corresponding respectively to a first machining feature indicated by a first user selection 84 and a second machining feature indicated by a second user selection 84.

Retrieving 28 may include retrieving information associated with one or more of the similar machining features, such as status of the forming machine and/or the workpiece before and/or after the execution of the corresponding machining code (e.g., precondition states and/or post-condition states of machining operations and/or toolpaths within the machining code, as discussed further herein).

Methods 10 may comprise parameterizing and/or adjusting 34 the retrieved machining code to compensate for differences between the input machining features and the similar machining features of the selections and/or search results. Parameterization may be useful to adjust the retrieved machining code to resize, reposition, reorient, repeat, and/or reconfigure the similar machining feature.

Parameterizing and/or adjusting 34 may include parameterizing the retrieved machining code to allow for changes in at least one of size, position, orientation, material type, and surface finish of the similar machining feature. Parameterization may result in parameterized machining code. Parameterizing and/or adjusting 34 may include adjusting the retrieved machining code with or without prior parameterization. The differences between the input machining features and the similar machining features may include at least one of size, position, orientation, material type, and surface finish. Parameterizing and/or adjusting 34 may include parameterizing and/or adjusting at least one of absolute motion commands, relative motion commands, positioning commands, orientation commands, tool speed commands, forming machine feed commands, and/or tool selection commands. Parameterizing and/or adjusting 34 may include translating, rotating, and/or scaling (in time and/or space) the toolpaths of the retrieved machining code.

Parameterizing and/or adjusting 34 may be directed by the user and/or may be performed automatically. For example, parameterizing and/or adjusting 34 may present the user with representations of the input machining features, the similar machining features, and/or a stock piece model and allow the user to adjust the position, orientation, and/or scale for each of the machining features presented. For example, the user may adjust a similar machining feature to match the corresponding input machining feature. As another example, the user may locate a similar machining feature on a stock piece model. Further adjustment may include adjustment of forming technique, e.g., the operation time, the tool type, the tool speed, for the purpose of compensating for different materials and/or different forming machines. Automatic parameterizing and/or adjusting 34 methods may include parameterizing the retrieved machining code to form parameterized machining code, identifying differences between the input machining features and the corresponding similar machining feature, and adjusting the parameterized machining code to reduce and/or eliminate the differences.

Parameterizing and/or adjusting 34 may include adding machining code to the retrieved machining code to indicate and/or to effect the associated precondition state, if any, and/or the post-condition state, if any. For example, added machining code may change the state of the forming machine and/or workpiece before and/or after the execution of the retrieved machining code. Additionally or alternatively, auxiliary machining information that describes the status of the forming machine and/or the workpiece before and/or after the execution of the retrieved machining code (e.g., precondition states and/or post-condition states) may be associated with the retrieved machining code.

Precondition states and/or post-condition states may relate to the forming machine and/or the workpiece and may be described as corresponding forming machine precondition states, forming machine post-condition states, workpiece precondition states, and/or workpiece post-condition states. The precondition states represent the initial conditions, if any, required for valid execution of the retrieved machining code. If any preconditions are necessary, then execution of the retrieved machining code without the specified preconditions may result in damage to the forming machine and/or the workpiece, and/or may not result in the formation of the similar machining feature. The post-condition states represent the final condition of the forming machine and/or the workpiece after valid execution of the retrieved machining code. Precondition states and/or post-condition states may include a material type, a stock piece size, a stock piece 3D model, a workpiece model, a workpiece position, a workpiece orientation, a workpiece motion (e.g., a linear and/or rotational speed), a forming machine type, a forming machine operation parameter (e.g., position, orientation, and/or operation speed of a component of the forming machine, a forming machine temperature control state, and/or a forming machine lubrication control state), a tool type, a tool operation parameter (e.g., a tool position, a tool orientation, a tool operation speed, a tool spindle speed, a tool temperature, and/or a tool dispense rate). Additionally or alternatively, parameterizing and/or adjusting 34 may include adding machining code to the retrieved machining code that transitions the forming machine and/or workpiece from a predefined initial state to the precondition state and/or from the post-condition state to a predefined final state.

After the machining code is retrieved, and parameterized and/or adjusted as needed, the method of the example of FIG. 2 includes assembling 32 the machining code from the one or more sources together into the unified machining code 96. The unified machining code 96 includes instructions to form at least a portion of the designated part. The formed, designated part is indicated at 80. The unified machining code 96 includes machining code 90 to form each of the input machining features of the designated part.

Assembling 32 may be performed without the use of a CAM system. Additionally or alternatively, methods 10 may be performed as part of, and/or in parallel with, a CAM process. For example, some machining features of a designated part may be converted into machining code with aid of a CAM system, and other machining features of the designated part may be converted into machining code according to methods 10. Further additionally or alternatively, the unified machining code 96 may be converted into CAM code, and the machining features described by the unified machining code 96 may be further processed by a CAM system.

Typically, assembling 32 includes adding the retrieved (and optionally modified) machining feature code 92 into the unified machining code 96, generally in the form of a machining operation code block. Machining feature code 92 may be configured to execute in a predefined order within the unified machining code 96. Additionally or alternatively, assembling 32 may include adding machining code to the group of machining feature code 92. The added machining code may be transition machining code that transitions between different machining feature code 92 (including, e.g., between the post-condition state of the prior machining feature code 92 and the precondition state of the subsequent machining feature code 92), header machining code that establishes the precondition state of the forming machine and/or the workpiece before execution of the first machining feature code 92, and/or footer machining code that establishes a desired post-condition state of the forming machine and/or the workpiece after execution of the last machining feature code 92. The added machining code may indicate and/or effect the precondition states and/or the post-conditions states of one or more of the machining feature code 92, and may indicate and/or effect desired loading and/or unloading states for the forming machine and/or the workpiece.

As with the more general methods 10, methods 10 of the example of FIG. 2 may include forming 22 the designated part 80 with the unified machining code 96, simulating the unified machining code 96, reviewing the unified machining code 96, and/or editing the unified machining code 96.

FIG. 3 schematically represents programming system 40 and associated user interaction for part fabrication. Programming system 40 is configured to guide and/or to assist fabrication programming and/or to fabricate the associated part according to the present disclosure. Programming system 40 may be configured to perform any of the methods 10. Additionally or alternatively, methods 10 may be performed, at least in part, by using the programming system 40.

Programming system 40 includes a group of system modules that may interact with the user to perform the task of fabricating a part. System modules also may be referred to as agents, programs, processes, procedures, functions, and/or routines. System modules include a programming agent 46, a search agent 48, and a machining knowledge database 50, and typically include an archive 52 and a controller 54. Generally, the system modules are control logic and/or data stored in the programming system 40.

The fabricate part task may begin (indicated at 42) with the designated part 70 to be fabricated. The fabricate part task may include fabrication programming 44, also called user programming and/or forming machine programming (e.g., NC programming), and part fabrication 60 (e.g., forming the physical fabricated part 80 with a forming machine). Fabrication programming 44 generally results in a 3D model of the designated part, a machining strategy to form the designated part, and machining code to execute the machining strategy.

The programming agent 46 (also called a programming assistant) is configured to guide and/or to assist fabrication programming 44. The programming agent 46 may be configured to interact with the user (e.g., during fabrication programming 44), the search agent 48, the machining knowledge database 50, and the archive 52. The programming agent 46 may be configured to perform one or more steps of receiving 12 the input representation of the designated part, searching 14 the machining knowledge database, receiving 20 the user selection of search results, retrieving 16 machining strategy information, deriving 18 the machining strategy for the designated part, and guiding 24 the user to form at least a partial machining strategy for the designated part, as described with respect to FIGS. 1-2.

The programming agent 46 may analyze the machining information generated by the user of the programming system 40 to determine and/or to identify one or more machining features of the part. Machining features may be identified directly or indirectly by the user and/or may be identified by analyzing the 3D model and/or associated machining code (e.g., machining strategy code, machining operation code, toolpath code, and/or machining feature code) as discussed herein.

The programming agent 46 may be configured to accept at least two machining code inputs (which each may be machining feature code) that correspond to at least two machining features from formed parts (e.g., from search results). The two machining features may come from the same or different formed parts (e.g., at least one machining feature from one formed part and at least one machining feature from another formed part). The programming agent 46 may extract machining feature code from the corresponding machining code as described herein. The programming agent 46 also may assemble 32 the unified machining code, as described with respect to FIG. 2.

The programming agent 46 may act for the user and/or other system modules. The programming agent 40 may be at least semi-autonomous and/or may have at least some degree of flexible behavior, potentially reacting to and/or anticipating changing conditions (such as the actions of the user of the programming system 40). The programming agent 46 may act independently of the fabrication programming 44, in conjunction with the fabrication programming 44, concurrently with the fabrication programming 44, subsequent to the fabrication programming 44, prior to the fabrication programming 44, and/or based upon user inputs (e.g., a user request). For example, the programming agent 46 may include a data mining agent configured to monitor for new machining information generated by the user, optionally notifying and/or prompting the user about missing and/or uncovered machining information. As another example, the programming agent 46 may include, and/or may be, a programming assistant configured to search for and/or to suggest machining strategy for the designated part and/or machining features of the designated part.

The user may directly operate the programming agent 46 and/or the programming system 40, e.g., by interacting with a user interface of the programming agent and/or the programming system. For example, the user may explicitly or implicitly designate a new part, a designated part 3D model, and/or a designated part machining strategy. Additionally or alternatively, the programming agent 46 (and/or the programming system 40) may include one or more background processes, such as a crawler and/or a daemon, that search and/or monitor part data. The programming agent 46 may periodically check the state of the archive 52 and/or the status of the fabrication programming 44 to generate and/or to guide the machining strategy for the designated part.

The user of the programming system 40 may utilize the programming system to create the machining strategy and/or the machining code for the designated part and/or may utilize another system to create the machining strategy and/or the machining code (e.g., a CAM system, a NC programming system, and/or a G-code editor). That is, the user may be guided by the programming system 40 and may rely on another system to implement and/or produce the resulting machining strategy and/or machining code.

The programming agent 46 may be configured to associate new machining information into the machining knowledge database 50 responsive to the user of the programming system 40 creating programming information to fabricate the designated part (e.g., by fabrication programming 44). The programming agent 46 may be configured to receive and/or gather the new machining information and to assemble and/or to fuse the new machining information into a unified data set (e.g., a bundle, a package, and/or a packet). Further, the programming agent 46 may be configured to associate the new machining information into the machining knowledge database 50. The new machining information may be from different sources (i.e., heterogeneous data sources) and/or may be in different formats (i.e., heterogeneous data formats). Some of the machining information may be in human-readable format, not specifically in a data transfer format (i.e., a machine friendly format). The programming agent 46 may be configured to read and/or parse the data, and/or may be configured to identify specific information within the data. Moreover, the programming agent 46 may be configured to unify (e.g., harmonize, bundle, and/or package) the read, parsed, and/or identified data into the unified data set (also called the unified machining information). Thusly, assembling and/or fusing the data may include extracting, collecting, aggregating, mapping, converting, transferring, copying, replicating, reformatting, integrating, curating, scraping, and/or coalescing the data and/or the machining information. The unified machining information created by the programming agent 46 may be a broader, more robust, description of the part fabrication process than the individual components of the machining information generated by the user.

The programming agent 46 may analyze the machining information generated by the user of the programming system 40 to determine and/or to estimate the designated part, machining features of the designated part and/or characteristics of the designated part. The information gleaned from analyzing the machining information may be used to inform and/or to assist the user during fabrication programming 44 and/or may be used to program and/or to fabricate the designated part (e.g., part fabrication 60). The programming agent 46 may utilize the analyzed information to generate a search query to search for parts, machining features and/or characteristics similar to those of the designated part.

The programming agent 46 may search the machining knowledge database 50 with the search agent 48. The search agent 48 is configured to search for and retrieve machining information stored and/or associated within the machining knowledge database 50. The search agent 48 may be configured to accept input (a search query) from the programming agent 46 and/or to provide output (a search result) to the programming agent 46. The search agent 48 may include subcomponents, such as a search engine and/or a query module. The search agent 48 may be configured to perform at least a portion of one or more of the steps of receiving 12 the input representation of the designated part, searching 14 the machining knowledge database, receiving 20 the user selection of search results, and retrieving 16 machining strategy information, as described with respect to FIGS. 1-2.

The search agent 48 may be configured to search the machining knowledge database 50 for 3D models, machining features, machining strategies, and/or associated machining code that are similar to the designated part. The search agent 48 may be configured to receive and/or generate a search query, based upon user input (e.g., from the programming agent 46) that describes the designated part, and/or to send the search query to the search engine. The search agent 48 may produce the search result based on the search query. The search result may include machining information relating to one or more parts of the machining knowledge database 50 that are similar to the designated part and/or that include one or more machining features that are similar to a machining feature of the designated part.

The programming agent 46 may act upon the search result provided by the search agent 48. For example, the programming agent 46 may provide and/or suggest to the user a list of machining strategies and/or machining operations that relate to similar parts and, hence, that may be useful to guide the development of a machining strategy and/or a machining operation for the designated part. As another example, the programming agent may classify and/or group the designated part with similar parts, features, and/or characteristics, optionally associating the designated part with the similar parts, features, and/or characteristics within the machining knowledge database 50. Classification and/or grouping may be used to inform and/or to assist the user during fabrication programming 44 and/or may be used to program and/or to fabricate a new part similar to the designated part and/or a machining feature similar to a machining feature of the designated part. For example, the programming agent may suggest, based upon the classification and/or grouping, similar parts and/or machining features to the user to review before and/or during the fabrication programming 44. As another example, the classified and/or grouped machining information may inform and/or assist a future user of the programming system 40 during a future fabrication programming task 44.

The programming system 40 may include a controller 54 programmed to control and/or to coordinate operation of one or more of the system modules. For example, the controller 54 may operate the programming agent 46 to guide the user in producing and/or to produce machining strategy for the designated part.

The programming system 40, the programming agent 46, and/or the controller 54 may be configured to identify expected and/or requisite machining information to fabricate the designated part and may be configured to notify the user of missing machining information and/or machining information not received and/or acquired. For example, the programming agent 46 and/or the controller 54 may be configured to monitor the machining information and/or to notify the user of missing machining information and/or machining information not received and/or acquired. Further, the programming system 40 and/or the controller 54 may be configured to present to the user a workflow for fabricating 60 the designated part and/or for fabrication programming 44. The workflow may include steps to fabricate the designated part, steps to program the machining strategy for the designated part, and/or steps to create the machining information to be associated by the programming system 40 (e.g., by the programming agent 46). For example, the programming system 40 and/or the controller 54 may notify and/or prompt the user about the workflow, e.g., presenting a list of steps upon startup. The programming system 40 and/or the controller 54 may be configured to enforce the completion of one or more steps of the workflow, for example, prompting the user to complete the step and/or preventing the user from beginning and/or completing another step. For example, the programming system 40 and/or the controller 54 may notify the user of received and/or missing machining information, prompt the user for missing machining information, and/or require the user to provide missing machining information.

Where data, data files, parameters, variables, constants and the like are referenced as being transferred to, sent to, passed to, received from, and/or returned from two or more components of programming system 40, the corresponding data, data files, parameters, variables, constants, etc. may be electronically transferred, in whole or in part, as copies, references, links, and/or pointers, and may be electronically transferred directly or indirectly (via intermediary processes).

Figure 4:
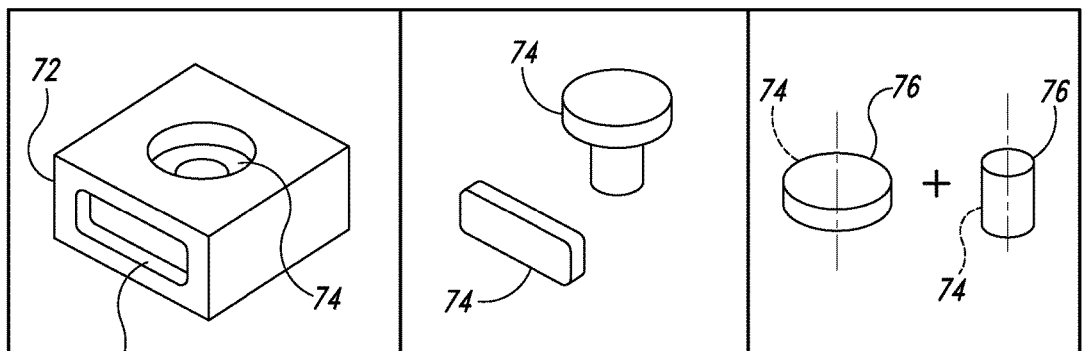
FIG. 4 schematically represents identifying machining features of a 3D model.

FIG. 4 represents a somewhat simplified example of identifying machining features 74 of a 3D model. Though the 3D model in the example of FIG. 4 is the input 3D model 72 of the designated part, identifying machining features may be performed with the input 3D model 72, a stored 3D model of the machining knowledge database, or other models, as discussed herein. In the example of FIG. 4, the input 3D model 72 includes two machining features 74, namely, a top counterbored hole and a front pocket. The center panel of FIG. 4 represents the machining features 74 as the corresponding negative geometry (i.e., the amount of material that would be removed from a close-fitting stock piece to produce the respective machining features 74). Machining features 74 may be further decomposed into one or more sub-features or shape primitives 76, as shown in the right panel of FIG. 4. In this example, the shape primitives 76 are a wide, flat cylinder and a narrow, tall cylinder. The shape primitives 76 each may be a machining feature 74.

FIGS. 5A, 5B, and 5C represent three steps, stages, and/or operations of a part fabrication process. FIG. 5A illustrates a stock piece 110 to be formed into the designated part 70. Machining features 74 of the designated part 70 are indicated in dotted line to illustrate how and/or where the stock piece 110 is to be modified. When presented with a designated part 70 (such as the example of FIG. 5A), the user may consider forming, and/or may be required to form, the machining features 74 in two or more toolpaths and/or two or more machining operations. The operations and the order of operations may be suggested and/or provided as described herein, e.g. with respect to deriving 18 and/or guiding 24 presented in FIGS. 1-2. In the example of FIGS. 5B and 5C, the machining strategy is executed in two operations, corresponding to FIGS. 5B and 5C respectively.

FIG. 5B illustrates a first machining operation 102 in which the stock piece 110 is held by a first fixture 120 with the face of the stock piece that will be cut to form a first machining feature 114 facing upwards. The orientation and positioning of the stock piece 110 for the first machining operation 102 is referred to as a first hold position 104. The first machining feature 114 may be formed while the stock piece 110 is held in the first hold position 104 with the first fixture 120. At the completion of the first machining operation 102, the stock piece 110 has the first machining feature 114 formed therein. The partially formed stock piece 110 is called a workpiece 112.

FIG. 5C illustrates a second machining operation 106 in which the workpiece 112 is held by a second fixture 122 with the face of the workpiece that will be cut to form a second machining feature 116 facing upwards. The second fixture 122 may be the first fixture 120 or a different fixture. The orientation and positioning of the workpiece 112 for the second machining operation 106 is referred to as a second hold position 108. The second hold position 108 generally is different than the first hold position 104. In the examples of FIGS. 5B and 5C, the workpiece 112 is rotated between the first hold position 104 and the second hold position 108 to orient a new face upwards. In the second hold position 108, the second machining feature 116 may be formed with the second machining operation 106. At the completion of the second machining operation 106, the workpiece 112 has the second machining feature 116 formed and the first machining feature 114 formed. In this example, the two machining features 114, 116 are the only machining features of the designated part and, thus, the completion of the second machining operation 106 results in the fabricated part 80.

First fixture 120 and second fixture 122 are illustrated schematically as platforms. Fixtures may include, and/or may be, supports, tables, jigs, fasteners, shims, clamps, vises, and/or weights. For example, fixtures may be modular apparatuses with moveable clamps to hold a variety of workpieces in any of a variety of positions and/or orientations.

Images, renderings, instructions, and/or machining code that describes and/or implements the machining operations (e.g., first and second machining operations 102, 106) and/or the hold positions (e.g., first and second hold positions 104, 108) may be a part of the machining strategy information that may be retrieved from the machining knowledge database and/or presented to the user (e.g., as part of the retrieving 16, the deriving, 18, and/or the guiding 24, described with respect to FIGS. 1-2).

Systems and methods for reusing machining code, including extracting, searching for, and retrieving machining information, are further described in U.S. patent application Ser. No. 14/799,421, entitled "SYSTEMS AND METHODS FOR SEARCHING A MACHINING KNOWLEDGE DATABASE" and filed Jul. 14, 2015, the entire disclosure of which is incorporated by reference for all purposes.

FIG. 6 schematically depicts a computerized system 200 that may be used to implement and/or instantiate programming systems 40 and components thereof, such as programming agent 46, search agent 48, machining knowledge database 50, and/or archive 52. The computerized system 200 may be programmed to perform and/or may store instructions to perform the methods described herein.

The computerized system 200 includes a processing unit 202 operatively coupled to a computer-readable memory 206 by a communications infrastructure 210. The processing unit 202 may include one or more computer processors 204 and may include a distributed group of computer processors 204. The computerized system 200 also may include a computer-readable storage media assemblage 212 that is operatively coupled to the processing unit 202 and/or the computer-readable memory 206, e.g., by communications infrastructure 210. The computer-readable storage media assemblage 212 may include one or more non-transitory computer-readable storage media 214 and may include a distributed group of non-transitory computer-readable storage media 214.

The communications infrastructure 210 may include a local data bus, a communication interface, and/or a network interface. The communications infrastructure may be configured to transmit and/or to receive signals, such as electrical, electromagnetic, optical, and/or acoustic signals.

The computerized system 200 may include one or more input-output devices 216 operatively coupled to the processing unit 202, the computer-readable memory 206, and/or the computer-readable storage media assemblage 212, e.g. by communications infrastructure 210. Examples of input-output devices 216 include monitors, keyboards, pointing devices (e.g., mice), touch screens, etc.

The computerized system 200 may include a distributed group of computers, servers, workstations, etc., which each may be interconnected directly or indirectly (including by network connection). Thus, the computerized system 200 may include one or more processing units 202, computer-readable memories 206, computer-readable storage media assemblages 212, and/or input-output devices 216 that are located remotely from one another.

One or both of the computer-readable memory 206 and the computer-readable storage media assemblage 212 include control logic 220 and/or data 222. Control logic 220 (which may also be referred to as software, firmware, and/or hardware) may include instructions that, when executed by the processing unit 202, cause the computerized system 200 to perform one or more of the methods described herein. Control logic 220 may include one or more of the system modules such as programming agent 46, search agent 48, machining knowledge database 50, archive 52, and controller 54. Data 222 may include the machining knowledge database 50 and/or data associated with the methods 10 (e.g., input representation of the designated part 70, input 3D model 72) and/or one or more of the system modules.

Examples of inventive subject matter according to the present disclosure are described in the following enumerated paragraphs.

A1. A method for determining a machining strategy for a designated part to be formed, the method comprising:
  receiving an input representation of a designated part;
  searching a machining knowledge database for one or more similar parts that have a shape similar to the designated part;

retrieving machining strategy information regarding the one or more similar parts from the machining knowledge database, wherein the machining strategy information includes at least one of machining code utilized to form the respective similar part, a machining operation utilized to form the respective similar part, and a machining strategy utilized to form the respective similar part; and deriving a machining strategy for the designated part based at least in part on the machining strategy information.

A2. The method of paragraph A1, further comprising forming the designated part based at least in part on the machining strategy information for the designated part.

A3. The method of any of paragraphs A1-A2, wherein the receiving the input representation includes at least one of accessing, identifying, and creating the input representation.

A4. The method of any of paragraphs A1-A3, wherein the receiving the input representation includes receiving the input representation from a user.

A5. The method of any of paragraphs A1-A4, wherein the receiving the input representation includes receiving at least one of a 3D model, a 3D sketch, a 2D model, a 2D sketch, and a 2D image of the designated part.

A6. The method of any of paragraphs A1-A5, wherein the input representation includes, optionally is, at least one of a 3D model, a 3D sketch, a 2D model, a 2D sketch, and a 2D image of the designated part.

A7. The method of any of paragraphs A1-A6, wherein the receiving the input representation includes receiving a selection that indicates one or more machining features of the designated part, and optionally wherein the searching includes searching the machining knowledge database for one or more similar parts that have one or more machining features similar to at least one of the machining features of the designated part.

A8. The method of any of paragraphs A1-A7, wherein the searching includes generating a search result including the one or more similar parts, and optionally including at least two similar parts.

A9. The method of any of paragraphs A1-A8, wherein the searching includes presenting search results to a user; wherein the search results include representations of the one or more similar parts; wherein the method further comprises receiving a user selection of at least one of the one or more similar parts; and wherein the retrieving includes retrieving machining strategy information regarding the user selection.

A9.1. The method of paragraph A9, wherein the user selection includes a selected machining feature of one of the similar parts, optionally wherein the user selection includes a first selected machining feature of one of the similar parts and a second selected machining feature of another of the similar parts.

A9.2. The method of any of paragraphs A9-A9.1, wherein the user selection includes a first similar part and a second similar part.

A10. The method of any of paragraphs A1-A9.2, further comprising identifying machining features from the input representation, and wherein the searching includes searching the machining knowledge database for one or more similar parts that have one or more machining features similar to at least one of the machining features of the designated part.

A10.1. The method of paragraph A10, wherein the identifying includes computing a stock volumetric difference between a stock piece model for the designated part and a/the 3D model of the designated part, and optionally wherein the identifying includes identifying discontinuous volumes of the stock volumetric difference as separate machining features.

A10.2. The method of any of paragraphs A10-A10.1, wherein the identifying includes computing a box volumetric difference between a bounding box of a/the 3D model of the designated part and the 3D model of the designated part, and optionally wherein the identifying includes identifying discontinuous volumes of the box volumetric difference as separate machining features.

A10.3. The method of any of paragraphs A10-A10.2, wherein the identifying includes computing a negative geometry of a/the 3D model of the designated part, and optionally wherein the identifying includes identifying discontinuous volumes of the negative geometry as separate machining features.

A10.4. The method of any of paragraphs A10-A10.3, wherein the identifying includes recognizing discontinuous volumes and decomposing each of the recognized discontinuous volumes into a set of primitive shapes; wherein the identifying includes identifying each primitive shape as a machining feature; and optionally wherein the primitive shapes are at least one of a geon, a plane, a pocket, a hole, and a contour.

A11. The method of any of paragraphs A1-A10.4, wherein the searching is based at least in part on at least one of a material type of the designated part, a size of the designated part, a stock piece to be utilized to form the designated part, a feedstock to be utilized to form the designated part, a forming machine type to be utilized to form the designated part, and a tool type to be utilized to form the designated part.

A11.1. The method of paragraph A11, wherein the forming machine type is at least one of an NC machine, a machining center, a 3D printer, a 3-axis machine, a multi-axis machine with at least 4 axes, and a multi-axis machine with at least 5 axes.

A12. The method of any of paragraphs A1-A11.1, wherein the one or more similar parts each independently were formed with at least one of an NC machine, a machining center, a 3D printer, a 3-axis machine, a multi-axis machine with at least 4 axes, and a multi-axis machine with at least 5 axes.

A12.1. The method of paragraph A12, wherein all of the similar parts were formed with a same type of forming machine.

A13. The method of any of paragraphs A1-A12.1, wherein at least one similar part includes a machining feature similar to a machining feature of the designated part, and optionally wherein the machining feature of the similar part is related to the machining feature of the designated part by at least one of scaling, translation, and rotation.

A14. The method of any of paragraphs A1-A13, further comprising receiving one or more search criteria from a/the user, wherein the one or more search criteria include at least one of a material type, a part size, a stock piece description, a feedstock description, a machining feature, a forming machine type, and a tool type; and further comprising at least one of searching and repeating the searching based at least in part on the search criteria.

A15. The method of any of paragraphs A1-A14, further comprising receiving, from a/the user, a refined search criterion and repeating the searching based in part on the refined search criterion; wherein the refined search criterion includes at least one of a material type, a part size, a stock piece description, a feedstock description, a machining feature, a forming machine type, and a tool type.

A16. The method of any of paragraphs A1-A15, wherein the retrieving includes retrieving machining strategy information for at least two of the one or more similar parts.

A17. The method of any of paragraphs A1-A16, wherein the retrieving includes retrieving fixturing information regarding the similar parts, optionally wherein the fixturing information includes at least one of a 3D model of a fixture utilized to form the respective similar part, at least one of a rendering and an image of a fixture holding the respective similar part during a processing step utilized to form the respective similar part, and a hold orientation utilized to form the respective similar part.

A18. The method of any of paragraphs A1-A17, wherein each of the machining operations of the machining strategy information corresponds to one or more machining features of the respective similar part.

A19. The method of any of paragraphs A1-A18, wherein each of the machining operations of the machining strategy information includes machining operation code.

A20. The method of any of paragraphs A1-A19, wherein each of the machining strategies of the machining strategy information corresponds to one or more machining operations.

A21. The method of any of paragraphs A1-A20, wherein each of the machining strategies of the machining strategy information includes machining strategy code.

A22. The method of any of paragraphs A1-A21, wherein the machining code utilized to form the respective similar part is machining feature code utilized to form a machining feature of the respective similar part.

A23. The method of any of paragraphs A1-A22, wherein the retrieving includes retrieving a machining code block utilized to form a portion of one of the one or more similar parts, and optionally wherein the portion is a machining feature of the similar part that is similar to a machining feature of the designated part.

A23.1. The method of paragraph A23, wherein the retrieving the machining code block includes parsing the machining code block to extract a machining feature code block, and optionally wherein the parsing includes separating the machining code block according to at least one of machining operations, toolpaths, and tool selection commands.

A24. The method of any of paragraphs A1-A23.1, wherein the retrieving includes retrieving a first machining code block utilized to form a portion of a first similar part of the one or more similar parts and retrieving a second machining code block utilized to form a portion of a second similar part of the one or more similar parts, and wherein the deriving includes assembling a unified machining code block from the first machining code block and the second machining code block.

A24.1. The method of paragraph A24, wherein the first machining code block is machining operation code and the second machining code block is machining operation code.

A24.2. The method of any of paragraphs A24-A24.1, wherein the first machining code block is machining feature code and the second machining code block is machining feature code.

A24.3. The method of any of paragraphs A24-A24.2, wherein the portion of the first similar part is a machining feature similar to a first machining feature of the designated part and wherein the portion of the second similar part is a machining feature similar to a second machining feature of the designated part.

A24.3.1. The method of paragraph A24.3, wherein the retrieving the first machining code block includes parsing the first machining code block to extract a first feature code block and wherein the retrieving the second machining code block includes parsing the second machining code block to extract a second feature code block.

A24.3.1.1. The method of paragraph A24.3.1, wherein the parsing the first machining code block includes separating the first machining code block according to at least one of machining operations, toolpaths, and tool selection commands, and wherein the parsing the second machining code block includes separating the second machining code block according to at least one of machining operations, toolpaths, and tool selection commands.

A25. The method of any of paragraphs A1-A24.3.1.1, wherein the machining strategy information includes machining code utilized to form at least a portion of one similar part and wherein the deriving includes parameterizing the machining code to form a parameterized machining code block.

A25.1. The method of paragraph A25, wherein the parameterizing includes parameterizing at least one of absolute motion commands, relative motion commands, positioning commands, orientation commands, tool speed commands, forming machine feed commands, and tool selection commands within the machining code.

A25.2. The method of any of paragraphs A25-A25.1, wherein the parameterized machining code block is associated with a machining feature of the one similar part, and wherein the parameterizing includes parameterizing the machining code to allow for changes in at least one of size, position, orientation, material type, and surface finish of the machining feature.

A25.3. The method of any of paragraphs A25-A25.2, wherein the deriving includes adjusting the parameterized machining code block to form a machining feature of the designated part.

A26. The method of any of paragraphs A1-A25.3, wherein the machining strategy information includes stored machining code utilized to form a portion of one similar part, and wherein the deriving includes merging the stored machining code with machining code configured to form at least a portion of the designated part.

A27. The method of any of paragraphs A1-A26, wherein the deriving includes deriving machining code to form at least a portion of the designated part from machining code of the machining strategy information.

A28. The method of any of paragraphs A1-A27, wherein the deriving includes deriving a machining operation to form at least a portion of the designated part from at least one machining operation of the machining strategy information.

A29. The method of any of paragraphs A1-A28, wherein the deriving the machining strategy includes deriving the machining strategy targeted to a type of forming machine utilized to form at least one of the similar parts.

A30. The method of any of paragraphs A1-A29, wherein each of the machining operations includes an operation setup and a sequence of toolpaths.

A30.1. The method of paragraph A30, wherein the operation setup includes at least one of a forming machine type, a forming machine identification, a forming machine operation parameter, a forming machine temperature control state, a forming machine lubrication control state, a tool type, a tool identification, a tool setup, a tool operation parameter, a tool speed, a tool spindle speed, a tool temperature, a tool dispense rate, a workpiece description, a workpiece 3D model, and a workpiece setup.

A30.2. The method of any of paragraphs A30-A30.1, wherein each of the toolpaths corresponds to one or more machining features of the respective similar part.

A30.3. The method of any of paragraphs A30-A30.2, wherein each of the toolpaths is associated with toolpath code.

A30.3.1. The method of paragraph A30.3, further comprising parameterizing the toolpath code to form a parameterized toolpath code block, optionally wherein the parameterizing includes parameterizing at least one of absolute motion commands, relative motion commands, positioning commands, orientation commands, tool speed commands, forming machine feed commands, and tool selection commands within the toolpath code.

A30.3.2. The method of paragraph A30.3.1, wherein the toolpath code is associated with a machining feature of the respective similar part, and wherein the parameterizing includes parameterizing the toolpath code to allow for changes in at least one of size, position, orientation, material type, and surface finish of the machining feature.

A31. The method of any of paragraphs A1-A30.3.2, further comprising presenting a/the user with the machining strategy for the designated part.

A32. The method of any of paragraphs A1-A31, further comprising providing to a/the user a suggestion for machining strategy and/or machining operations based upon the machining strategy for the designated part.

A32.1. The method of paragraph A32, wherein the providing includes indicating at least one of a stock piece, a fixture, a hold orientation, and an operation order.

A32.2. The method of any of paragraphs A32-A32.1, wherein the providing includes notifying the user of missing machining information and/or machining information not received.

A33. The method of any of paragraphs A1-A32.2, further comprising providing to a/the user a suggestion for machining strategy and/or machining operations based upon the machining strategy information regarding the one or more similar parts.

A33.1. The method of paragraph A33, wherein the providing includes indicating at least one of a stock piece, a fixture, a hold orientation, and an operation order that was utilized to form at least one of the one or more similar parts.

A33.2. The method of any of paragraphs A33-A33.1, wherein the providing includes notifying the user of missing machining information and/or machining information not received.

A34. The method of any of paragraphs A1-A33.2, wherein a 'machining feature,' where used, is a forming feature.

A35. The method of any of paragraphs A1-A34, wherein 'machining code,' where used, is at least one of forming code, code for a forming machine, code for a 3D printer, code for a NC machine, and G-code.

A36. A computerized system to create machining strategy for a designated part to be machined, the computerized system comprising:
  computer-readable memory;
  a processing unit operatively coupled to the memory; and
  a computer-readable storage media assembly, wherein the storage media assembly is operatively coupled to the memory and includes instructions, that, when executed by the processing unit, cause the computerized system to perform the method of any of paragraphs A1-A35.

A37. Machining code created by the method of any of paragraphs A1-A35 or with the computerized system of paragraph A36.

A38. A part formed by the method of any of paragraphs A1-A35, with the computerized system of paragraph A36, or with the machining code of paragraph A37.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

The various disclosed elements of systems and apparatuses, and steps of methods disclosed herein are not required of all systems, apparatuses and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system, apparatus, or method. Accordingly, such inventive subject matter is not required to be associated with the specific systems, apparatuses and methods that are expressly disclosed herein, and such inventive subject matter may find utility in systems and/or methods that are not expressly disclosed herein.

INDUSTRIAL APPLICABILITY

The systems and methods disclosed herein are applicable to mechanical manufacturing industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method for determining a machining strategy for a designated part to be formed, the method comprising:
    receiving an input representation of a designated part having one or more first features;
    searching, based on the input representation, a machining knowledge database for two or more similar parts that have one or more second features that are similar to the one or more first features of the designated part;
    retrieving machining strategy information regarding the two or more similar parts from the machining knowledge database, wherein the machining strategy information includes at least one of machining code utilized to form the respective similar part, a machining operation utilized to form the respective similar part, and a machining strategy utilized to form the respective similar part, and wherein the retrieving includes:
        parsing a first machining code block configured to form a first particular part of the two or more similar parts, and
        extracting, from the first machining code block, a first machining feature code block configured to form at least a first particular feature of the one or more second features that are similar to the one or more first features of the designated part;
        parsing a second machining code block configured to form a second particular part of the two or more similar parts, and
        extracting, from the second machining code block, a second machining feature code block configured to form at least a second particular feature of the one or more second features that are similar to the one or more first features of the designated part; and
    deriving a machining strategy for forming the designated part based at least in part on the first machining feature code block and the second machine feature code block.

2. The method of claim 1, further comprising forming the designated part based at least in part on the machining strategy for forming the designated part.

3. The method of claim 1, wherein the two or more similar parts each independently were formed with a multi-axis machine with at least 4 axes, and wherein the deriving the machining strategy includes deriving the machining strategy targeted to the multi-axis machine with at least 4 axes.

4. The method of claim 1, wherein the searching includes presenting search results to a user, wherein the search results include representations of the two or more similar parts, wherein the method further comprises receiving a user selection of the first and second particular parts of the two or more similar parts, and wherein parsing the first machining code block and parsing the second machining code block are performed based at least in part on the user selection.

5. The method of claim 4, wherein the user selection includes a selection of the first particular feature and the second particular feature of the one or more second features that are similar to the one or more first features of the designated part.

6. The method of claim 1, wherein the one or more first features include machining features of the designated part, the method further comprising identifying the machining features of the designated part from the input representation and wherein the searching includes searching the machining knowledge database for two or more similar parts that have one or more machining features similar to at least one of the machining features of the designated part.

7. The method of claim 6, wherein the input representation includes a 3D model of the designated part, wherein the identifying includes computing a box volumetric difference between a bounding box of the 3D model of the designated part and the 3D model of the designated part, and wherein the identifying includes identifying discontinuous volumes of the box volumetric difference as separate machining features.

8. The method of claim 6, wherein the input representation includes a 3D model of the designated part, wherein the identifying includes computing a negative geometry of the 3D model of the designated part, and wherein the identifying includes identifying discontinuous volumes of the negative geometry as separate machining features.

9. The method of claim 1, wherein the machining strategy information includes at least one machining operation utilized to form the respective similar part and wherein each of the machining operations of the machining strategy information includes an operation setup and a sequence of toolpaths.

10. The method of claim 9, wherein each of the toolpaths corresponds to one or more machining features of the respective similar part.

11. The method of claim 9, wherein each of the toolpaths is associated with toolpath code.

12. The method of claim 1, wherein at least one of (i) extracting the first machining feature code block includes extracting the first machining feature code block by separating the first machining feature code block according to at least one of machining operations, toolpaths, and tool selection commands, and (ii) extracting the second machining feature code block includes extracting the second machining feature code block by separating the second machining feature code block according to at least one of machining operations, toolpaths, and tool selection commands.

13. The method of claim 1, wherein the machining strategy information includes machining code utilized to form at least a machining feature of each of the two or more similar parts; wherein the deriving includes:
parameterizing the machining code to form a parameterized machining code block that is associated with the machining feature of each of the two or more similar parts; the parameterizing including parameterizing the machining code to allow for changes in at least one of size, position, orientation, material type, and surface finish of the machining feature of each of the two or more similar parts; and
adjusting the parameterized machining code block to form a machining feature of the designated part.

14. The method of claim 1, wherein the retrieving includes retrieving fixturing information regarding the two or more similar parts; wherein the fixturing information includes at least one of a 3D model of a fixture utilized to form the respective similar part, at least one of a rendering and an image of a fixture holding the respective similar part during a processing step utilized to form the respective similar part, and a hold orientation utilized to form the respective similar part.

15. The method of claim 1, further comprising presenting a user with the machining strategy for forming the designated part.

16. The method of claim 1, further comprising providing to a user a suggestion for machining strategy based upon the machining strategy information regarding the two or more similar parts.

17. The method of claim 16, wherein the providing includes indicating at least one of a stock piece, a fixture, a hold orientation, and an operation order that was utilized to form at least one of the two or more similar parts.

18. A method for determining a machining strategy for a designated part to be formed, the method comprising:
receiving an input representation of a designated part;
searching a machining knowledge database for two or more similar parts that have a shape similar to the designated part, wherein the searching includes generating a search result including the two or more similar parts;
retrieving machining strategy information regarding the two or more similar parts from the machining knowledge database; wherein the machining strategy information includes at least one of machining code utilized to form the respective similar part, a machining operation utilized to form the respective similar part, and a machining strategy utilized to form the respective similar part; and wherein the retrieving includes:
parsing a first machining code block utilized to form a portion of a first similar part of the two or more similar parts to extract a first portion of the machining strategy information; and
parsing a second machining code block utilized to form a portion of a second similar part of the two or more similar parts to extract a second portion of the machining strategy information; and
deriving a machining strategy for the designated part based at least in part on the machining strategy information and wherein the deriving includes assembling a unified machining code block from the first portion of the machining strategy information code block and the second portion of the machining strategy information.

19. The method of claim 18, wherein the first machining code block is machining feature code and the second machining code block is machining feature code.

20. The method of claim 18, wherein the portion of the first similar part is a machining feature similar to a first machining feature of the designated part, and wherein the portion of the second similar part is a machining feature similar to a second machining feature of the designated part.

21. The method of claim 18, wherein the parsing the first machining code block includes parsing the first machining code block to extract a first feature code block by separating the first machining code block according to at least one of machining operations, toolpaths, and tool selection commands; and wherein the parsing the second machining code block includes parsing the second machining code block to extract a second feature code block by separating the second machining code block according to at least one of machining operations, toolpaths, and tool selection commands.

22. The method of claim 18, wherein the receiving the input representation includes receiving a selection that indicates one or more machining features of the designated part, and wherein the searching includes searching the machining knowledge database for one or more similar parts that have one or more machining features similar to at least one of the machining features of the designated part.

23. The method of claim 18, further comprising identifying machining features from the input representation, and wherein the searching includes searching the machining knowledge database for one or more similar parts that have one or more machining features similar to at least one of the machining features of the designated part.

24. The method of claim 18, wherein the searching includes presenting search results to a user; wherein the search results include representations of the two or more similar parts; wherein the method further comprises receiving a user selection of at least two of the search results; wherein the retrieving includes retrieving machining strategy information regarding the user selection; and wherein the user selection includes a first selected machining feature of one of the similar parts and a second selected machining feature of another of the similar parts.

25. The method of claim 18, further comprising forming the designated part based at least in part on the machining strategy for the designated part.

26. A method for determining a machining strategy for a designated part to be formed, the method comprising:
receiving, by one or more processors of a computing device, an input representation of a designated part having one or more first features;
searching, based on the input representation, a machining knowledge database for two or more similar parts that have one or more second features that are similar to the one or more first features of the designated part;
retrieving, by the one or more processors, machining strategy information regarding the two or more similar parts from the machining knowledge database, wherein retrieving the machining strategy information includes parsing a first machining code block utilized to form a first similar part of the two or more similar parts to extract a first portion of machining code utilized to form at least one of the one or more second features of the first similar part of the two or more similar parts; and further wherein retrieving the machining strategy information includes parsing a second machining code block utilized to form a second similar part of the two or more similar parts to extract a second portion of machining code utilized to form at least one of the one or more second features of the second similar part of the two or more similar parts;
adjusting, by the one or more processors, at least part of the first portion and the second portion of machining code to form an adjusted machining code block configured to form at least one of the one or more first features of the designated part; and
deriving a machining strategy for forming the designated part based at least in part on the adjusted machining code block.

27. The method of claim 26, wherein adjusting the at least one of the first and the second portion of machining code to form the adjusted machining code block comprises identifying differences between the one or more first features of the designated part and the one or more second features of the first and second similar parts, and adjusting the at least one of the first and the second portion of machining code to reduce the differences.

28. The method of claim 26, wherein the searching includes presenting search results to a user, wherein the search results include representations of the two or more similar parts, wherein the method further comprises receiving a user selection of the first and second similar parts of the two or more similar parts, and wherein retrieving the machining strategy information is based at least in part on the user selection.

29. The method of claim 28, wherein the user selection includes a selection of the at least one of the one or more second features of the first and second similar parts.

* * * * *

UNITED STATES PATENT AND TRADEMARK OFFICE
CERTIFICATE OF CORRECTION

PATENT NO. : 10,466,681 B1
APPLICATION NO. : 14/842613
DATED : November 5, 2019
INVENTOR(S) : Richard Thomas Jones, Brian Dean McCabe and Christopher John Skubic Page 1 of 1

It is certified that error appears in the above-identified patent and that said Letters Patent is hereby corrected as shown below:

In the Claims

Claim 18, Column 34, Line 29, in the phrase "machining strategy information code block", please delete "code block".

Signed and Sealed this
Seventeenth Day of December, 2019

Andrei Iancu
*Director of the United States Patent and Trademark Office*